United States Patent [19]
Izumi et al.

[11] Patent Number: 5,535,010
[45] Date of Patent: Jul. 9, 1996

[54] PORTABLE IMAGE PROCESSING APPARATUS

[75] Inventors: Hirokazu Izumi, Nara; Masanobu Deguchi, Kashiba; Koji Oku, Yamatokoriyama; Shuuhei Yamamoto, Yamatokoriyama; Harumi Katayama, Yamatokoriyama, all of Japan

[73] Assignee: Sharp Kabushiki Kaisha, Osaka, Japan

[21] Appl. No.: 491,352

[22] Filed: Jun. 30, 1995

[30]     Foreign Application Priority Data

Jul. 6, 1994 [JP] Japan .................................. 6-154744

[51] Int. Cl.⁶ .......................................... B41J 13/00
[52] U.S. Cl. ........................ 358/296; 358/472; 347/222
[58] Field of Search ................................ 355/200, 309, 355/21, 72; 358/296, 472, 473, 474, 491; 347/3, 4, 152, 153, 110, 222

[56]              References Cited

U.S. PATENT DOCUMENTS 4,611,246  9/1986  Nihei ...................................... 358/472

FOREIGN PATENT DOCUMENTS 58-196145  of 1983  Japan .
 2-1686    1/1990  Japan .
4-256977  of 1992  Japan .

*Primary Examiner*—Joan H. Pendegrass
*Attorney, Agent, or Firm*—David G. Conlin; Kevin J. Fournier

[57]              ABSTRACT

A portable image processing apparatus includes a sheet holding section formed so as to have a substantially cylindrical shape, a holding roller for cylindrically holding a sheet along a side of the sheet holding section, a sheet carrying section with a doughnut-like shape, a printing section fixed in an opposite position to the side of the sheet holding section, a stepping motor for scanning for rotating the sheet holding section which holds a sheet on an axis of a cylinder, and a stepping motor for carrying for rotating the sheet carrying section from its inner circumference towards its outer circumference in order to transfer the sheet parallel to the axis of the sheet holding section. As a result, the apparatus is miniaturized, thereby making it possible to improve its portability.

35 Claims, 21 Drawing Sheets

PORTABLE IMAGE PROCESSING APPARATUS

FIELD OF THE INVENTION

The present invention relates to a portable image processing apparatus, such as a printer, an information reading apparatus, a copying apparatus, a facsimile, a typewriter, a word processor, which is capable of outputting characters and images on sheets and reading characters and images recorded on sheets.

BACKGROUND OF THE INVENTION

In recent years, a portable printer and copying apparatus have been put on the market. For example, Japanese Unexamined Utility Model Publication No. 58-196145/1983 discloses a conventional basic technique in such a portable printer.

The above disclosed technique relates to a recording paper holding apparatus which is used in a cylindrical scan recording apparatus as a forerunner of a portable printer. As shown in FIG. 24(a) and 24(b), the recording paper holding apparatus is arranged so as to cylindrically hold inserted recording paper 102 along an internal circumference of a cylindrical frame 101 and carry out recording with a point of a recording needle 104 which is extended from a driving section 103 provided in the middle of an inside of the frame 101 brought into contact with the recording paper 102. The driving section 103 is rotatable on an axis of the frame 101 and is capable of transferring along the axis.

However, in the above-mentioned conventional recording paper holding apparatus, miniaturization of the apparatus main body is limited, so there arises a problem that application of the conventional apparatus to portable image processing apparatuses, such as a portable printer, a portable copying apparatus, is extremely difficult.

In other words, the copying paper holding apparatus is of a construction that the recording paper 102 is fixed and the recording needle 104 is moved. For this reason, in the case where the recording paper 102 is held, if a length of the recording paper 102 is longer than the frame 101, the recording paper 102 loses its stability when recording is carried out on the recording paper 102 which is stuck out of the frame 101. Therefore, the frame 101 should be always longer than the length of the recording paper 102, so there arises a problem that miniaturization of an apparatus cannot be realized.

SUMMARY OF THE INVENTION

It is an object of the present invention to provide a portable image processing apparatus which is capable of improving its portability by miniaturizing the apparatus.

In order to achieve the above object, a portable image processing apparatus of the present invention is characterized by including:

sheet holding means having a cylindrical section which is formed so as to have a substantially cylindrical shape, the sheet holding means holding a sheet along a side of the cylindrical section;

image processing means for carrying out an image process on the sheet held by the sheet holding means, the image processing means being fixed in an opposite position to the side of the cylindrical section of the sheet holding means;

rotating means for rotating the sheet holding means on an axis of the cylindrical section; and sheet carrying means for carrying the sheet in a direction which is parallel to the axis of the cylindrical section of the sheet holding means.

With the above arrangement, at the time of image processing, a sheet is cylindrically held by the sheet holding means along the side of the cylindrical section which has been formed so as to have a substantially cylindrical shape, and in this state, the image process is carried out on the sheet by the image processing means fixed in an opposite position to the side of the cylindrical section of the sheet holding means. When the image process in a prescribed position is completed, the sheet holding means which holds the sheet is rotated on an axis of the cylindrical section by the rotating means. This makes an image process for the first line possible. When the image process for the first line is completed, the sheet is transferred by the sheet carrying means in a direction which is parallel to the axis of the cylindrical section of the sheet holding means. This makes an image process for the second line possible. When continuous image process in a scanning direction of a sheet by rotation of the sheet holding means which holds the sheet and carrying of the sheet in a carrying direction which intersects to the scanning direction by the sheet carrying means are alternately repeated, the image process on a whole sheet which has been cylindrically held is possible.

In other words, it is possible that a sheet is transferred in the image processing means, which has been fixed in the opposite position to the side, with the sheet cylindrically along the side of the cylindrical section in two directions which intersect to each other.

As a result, a size in the carry direction of the cylindrical section of the sheet holding means can be miniaturized to a substantially same size which is required by the image processing means for an image process. Moreover, in the case where a sheet of a maximum size to be used in the apparatus of the present invention is made along the side of the cylindrical section so that long sides of the sheet is parallel to the axis of the cylindrical section, a diameter of the cylindrical section can be reduced to a substantially same size that ends of short sides of the sheet are not overlapped. As a result, the apparatus is further miniaturized, thereby making it possible to improve its portability.

In addition, the portable image forming apparatus can be arranged so as to include (1) a storage for storing the sheet holding means, image processing means, rotating means and sheet carrying means and (2) an outer frame section having a dented section for wholly storing the storage, and such that said storage is Joined to the outer frame section so as to be freely raised from (raised position) and lowered in (stored position) said outer frame section.

With the above arrangement, since in the case of the stored position the apparatus has a small amount of projected portions, its portability is improved and possibility of damage to the apparatus is reduced. Furthermore, the outer frame section is used as a backing stand in the case where the storage is raised, thereby making it possible to stabilize the apparatus in the case where the image process is carried out in the raised position.

In addition, the portable image processing apparatus can be arranged such that image processing means is attached to a cartridge section which is detachable from the apparatus. With this arrangement, when a plurality of cartridge sections to which different kinds of image processing means, such as one for reading an image, one for printing an image are respectively installed, are ready, these cartridge sections can be used by attaching to and removing from the apparatus according to demand. As a result, while the image processing apparatus main body is commonly used, functions can be simply switched only by replacing the cartridge sections, thereby making it possible to realize an image processing apparatus having excellent portability and multi-function.

In addition, the portable image processing apparatus may be arranged so as to further include:

an input section for inputting a size of a sheet by an operator;

processing range calculating means for obtaining a dimension of a processing range in a scanning direction and a carrying direction from a sheet size inputted from the input section; and control means for alternately commanding the image processing means to carry out the image process and driving the rotating means or the sheet carrying means until all the image processes in the processing range is completed, wherein the control means drives the rotating means until a transferring distance of a sheet in the scanning direction reaches the dimension of the processing range in the scanning direction, which has been obtained by the processing range calculating means, and in the case where the transferring distance reaches the dimension, reset the transferring distance of the sheet in the scanning and drives the sheet carrying means.

With the above arrangement, when the image process in the scanning direction is continuously carried out and an image process for 1 line in the scanning direction of a sheet is completed, after the sheet is carried in the carrying direction, the image process on the sheet in the scanning direction is again carried out continuously. This makes the image process on the whole sheet possible.

In addition, with the above arrangement, the control means may control the rotating means so as to reverse the rotating direction of the sheet holding means every time the transferring distance of the sheet in the scanning direction reaches the dimension in the processing range in the scanning direction obtained by the processing range calculating means. With this arrangement, after an image process for the first line is carried out from a starting end to a last end, the image process for the second line is carried out in a reverse direction to the first line, namely, from the last end to the starting end. In other words, this arrangement makes it possible to decrease time required for the image process on the whole sheet shorter than of the arrangement that the image processing means is relatively transferred from the last end of the first line to the starting end of the second line.

In addition, a portable image processing apparatus of the present invention is characterized by including:

a sheet holding section having (1) a cylindrical section which is formed so as to have a substantially cylindrical shape and (2) a sheet carrier which is positioned on an outer circumference of the cylindrical section so that a small gap is formed between the cylindrical section and the sheet carrier and that an axis of rotation is included in a plane which intersects at right angles to the axis of the cylinder of the cylindrical section and (3) a pressing roller for contacting with and leaving from the sheet carrier, the sheet holding section holding a sheet inserted in the gap between the cylindrical section and the sheet carrier with the sheet pressed against the sheet carrier by the pressing roller;

image processing means for carrying out an image process on the sheet held by the sheet holding section, the image processing means being fixed in an opposite position to the side of the cylindrical section of the sheet holding section;

sheet holding section driving means for rotating the sheet holding section on the axis of the cylindrical section; and sheet carrier driving means for rotating the sheet carrier on the axis of rotation.

With the above arrangement, the sheet, which has been inserted between the cylindrical section and the sheet carrier and pressed against the sheet carrier by the pressing roller so as to be held, is partially subject to the image process by means of the image processing means fixed in the opposite position to the side of the cylindrical section. Furthermore, when the sheet holding section which holds the sheet is rotated by the sheet holding section driving means, the image processing means transfers in the scanning direction relatively to the sheet. Moreover, when the sheet carrier having a rotating axis included in a plane which intersects to the axis of the cylindrical section is rotated on the rotating axis, the sheet inserted in the gap between the cylindrical section and the sheet carrier is carried in a carrying direction which is parallel to the axis of the cylindrical section, namely, intersects to the scanning direction.

As a result, a size of the cylindrical section of the sheet holding section in the carrying direction can be reduced to a substantially same size as of the image processing means required for the image process. Moreover, when a sheet with a maximum size to be used in the present apparatus is positioned along the side of the cylindrical section so that longs sides of the sheet is parallel to the axis of the cylindrical section, a diameter of the cylindrical section can be reduced to a size that ends of short sides of the sheet are not superimposed. As a result, the apparatus is further miniaturized, thereby making it possible to improve its portability.

For fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory drawing which shows an arrangement of a printing section in the portable image processing apparatus.

FIG. 8 is an explanatory drawing which shows a printing method in the portable image processing apparatus.

FIG. 19 is an explanatory drawing which shows a standing angle of a standing section of the portable image processing apparatus.

FIG. 24 shows an arrangement of a recording paper holding apparatus which is used for a conventional cylindrical scan recording apparatus.

DESCRIPTION OF THE EMBODIMENTS

EMBODIMENT 1

The following will discuss one embodiment of the present invention referring to FIGS. 1 through 17. Here, a portable image processing apparatus of the present embodiment is a printer, an information reading apparatus, a copying apparatus, a facsimile, a typewriter or a word processor, etc., for example, which outputs characters and images to paper, and which reads characters and images recorded on paper, and moreover, such an image processing apparatus is intended for a portable one, so the present embodiment will particularly explain a portable printer and a portable information reading apparatus.

Figure 1:
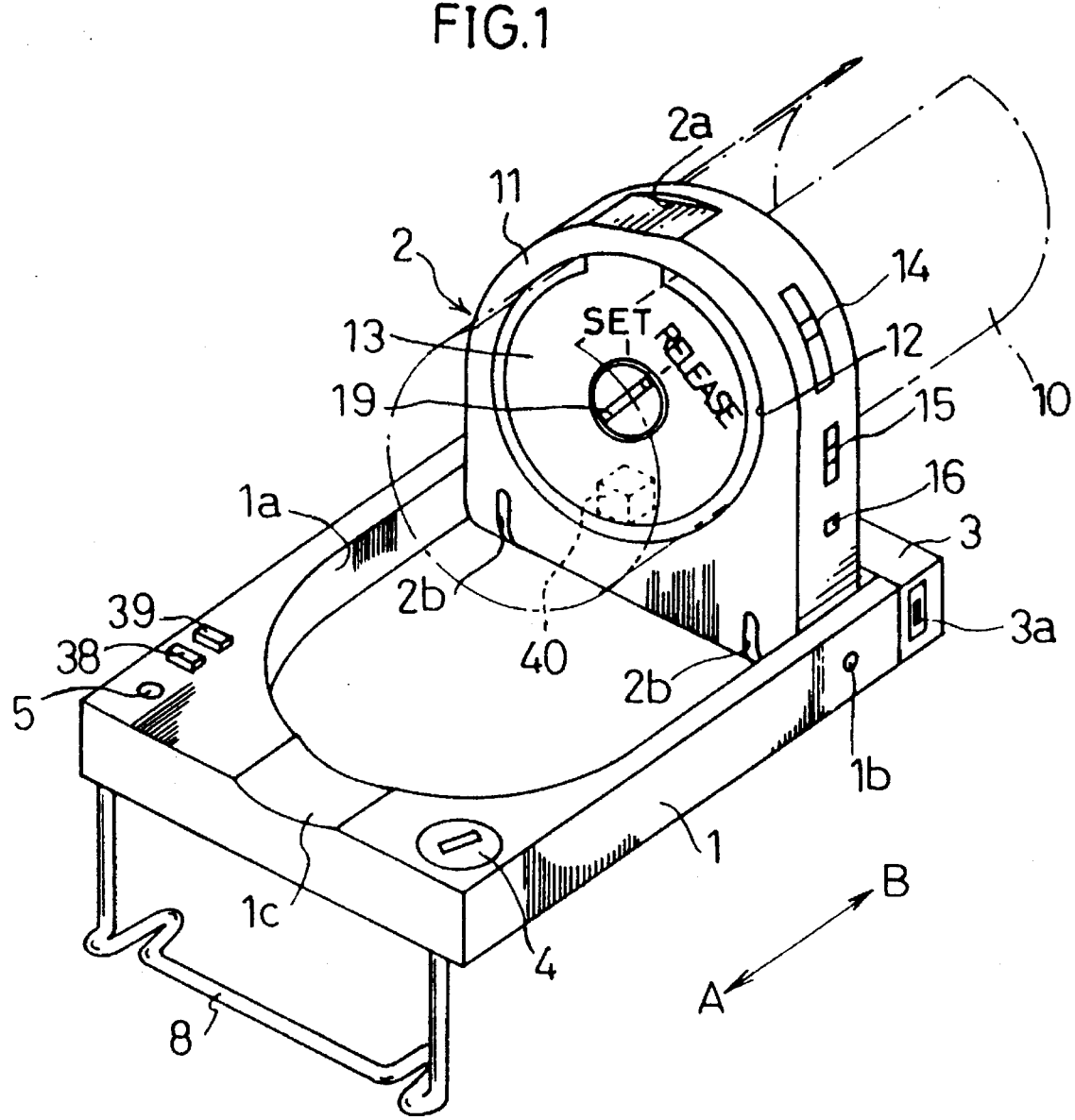
FIG. 1 is a perspective view which shows an arrangement of a portable image processing apparatus in one embodiment of the present invention.
Figure 2:
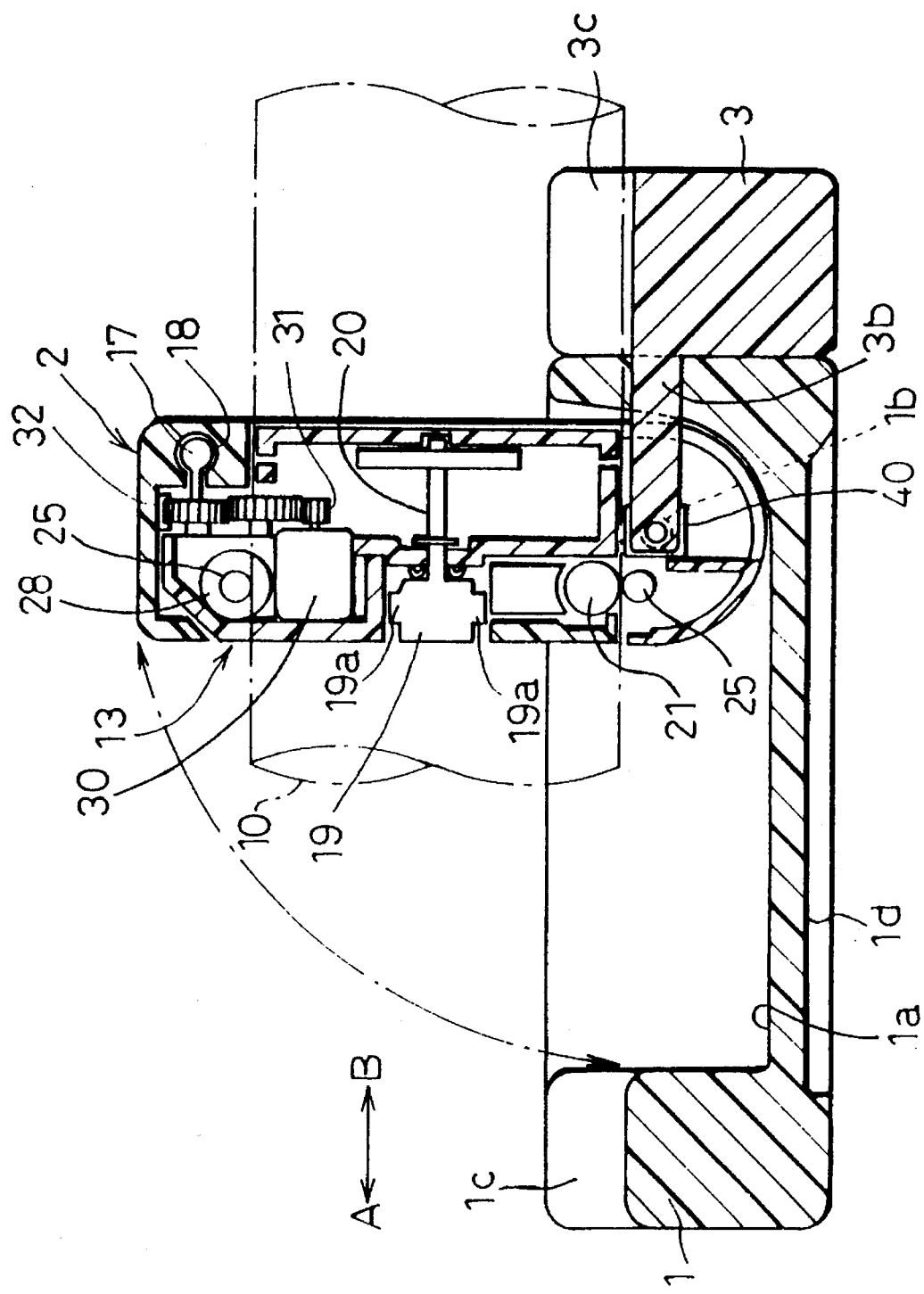
FIG. 2 is a side cross-sectional view which shows the arrangement of the portable image processing apparatus.

As shown in FIG. 1, in the portable image processing apparatus, a storage dented section 1a, which have a substantially U-shaped inner wall on its horizontal section, is provided in a substantially rectangular parallelepiped (for example, approximately 100×150×15 mm) apparatus main body 1. As shown in FIG. 2, as to the storage dented section 1a, its back side (side B of an arrow in the drawing) wall is connected with its bottom surface so that their connected surface is smoothly curved.

Figure 3:
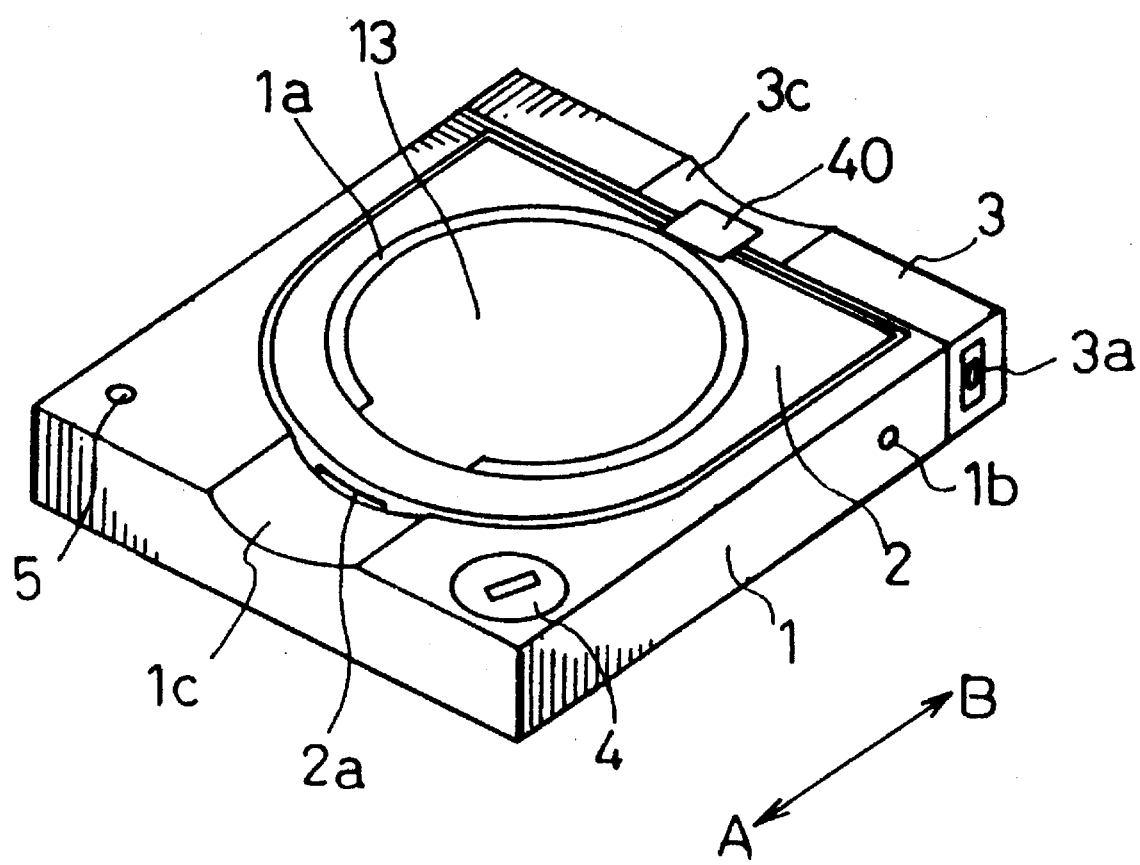
FIG. 3 is a perspective view which shows a storage posture of a rising section in the portable image processing apparatus.

The storage dented section 1a is provided with a rising section 2. The rising section 2 is formed so as to be freely raised from (in a raised position with respect to the apparatus main body 1) and lowered in (in a stored position that the rising section 2 is stored in the apparatus main body 1). In other words, as shown in FIG. 2, a bottom of the rising section 2 is formed so as to have a semicircular-section-like shape, and it is supported so as to be able to rotate by means of an axis of rotation 1b provided to the apparatus main body 1. Therefore, the rising section 2 is rotated on the axis of rotation 1b through an angle of 90° in a forward direction so as to be stored in the storage dented section 1a so that the rear surface of the rising section 2 and the surface of the apparatus main body 1 are substantially in one plane, as shown in FIG. 3.

In addition, in order to rise the rising section 2 again, a finger is put through a curved dented section 1c formed on a surface of the apparatus main body 1, the finger is put in a cutout section 2a formed in an upper end of the rising section 2 so that the rising section 2 is rotated on the axis of rotation 1b through an angle of 90° in a backward direction.

In addition, when the rising section 2 is vertically risen, it is slightly pressed elastically by a concave-convex portion (not shown) so as to be held.

Figure 4:
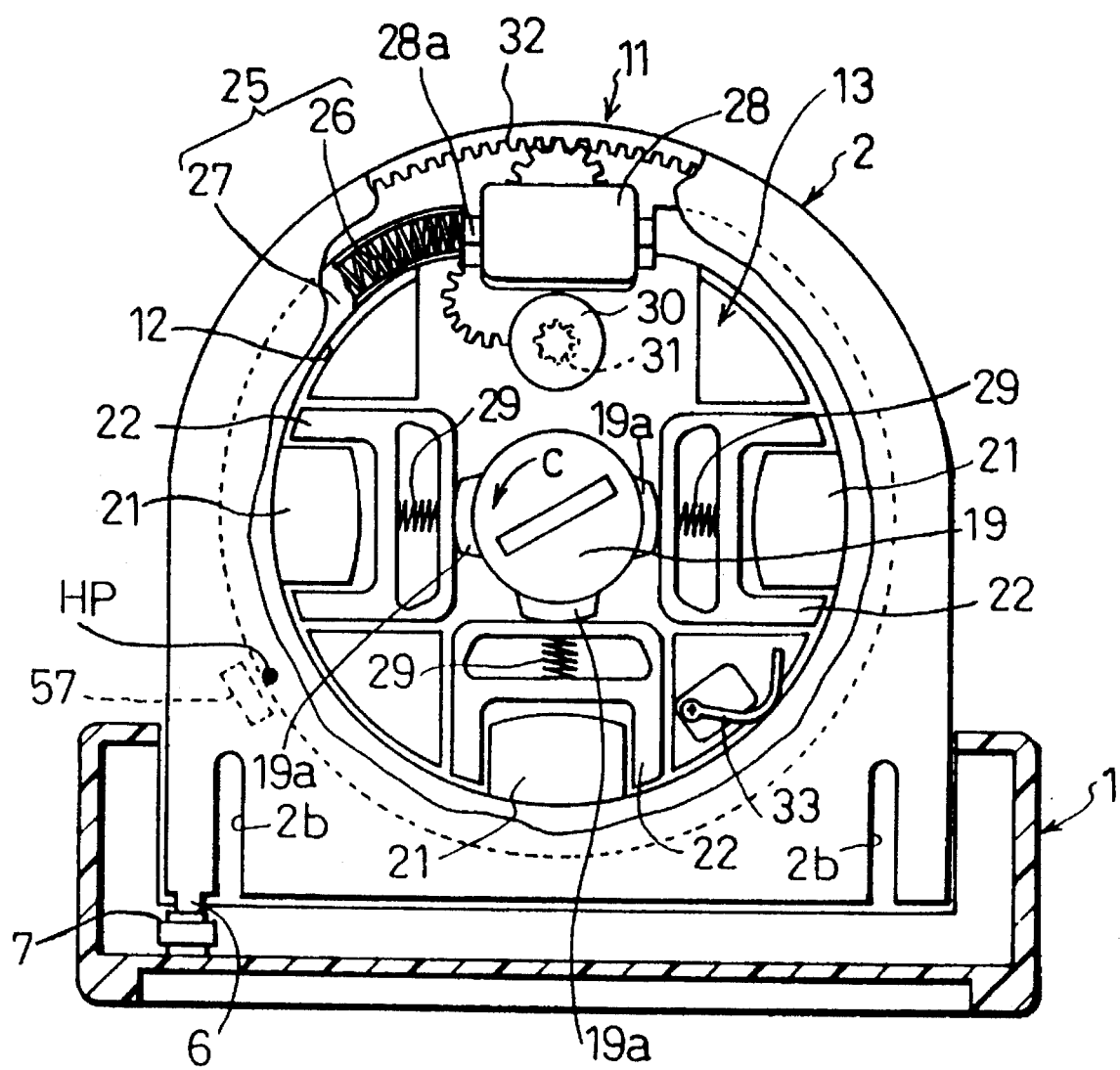
FIG. 4 is a front cross-sectional view which shows a part of the portable image processing apparatus by fracturing the apparatus.

Furthermore, also as shown in FIG. 4, notches 2b.2b are vertically formed in both right and left ends in a lower section of the rising section 2. When both sides of the notches 2b.2b are pressed, the both ends of the rising section 2 is slightly deflected, thereby making it possible to replace the rising section 2 by dismounting it from the apparatus main body 1.

Meanwhile, as shown in FIG. 1, a substantially rectangular-parallelepiped-shaped printing cartridge 3 with a same width as the apparatus main body 1 is provided on the back side (side B of an arrow in the drawing) of the apparatus main body 1, and it is freely installed/removed to/from the apparatus main body 1 by a claw 3a provided on a side of the cartridge. As shown in FIG. 2, the printing cartridge 3 is provided an arm 3b which is extended towards the apparatus main body 1, and a printing section 40 for carrying out printing on paper 10 is provided at a point of the arm 3b.

Figure 6A:
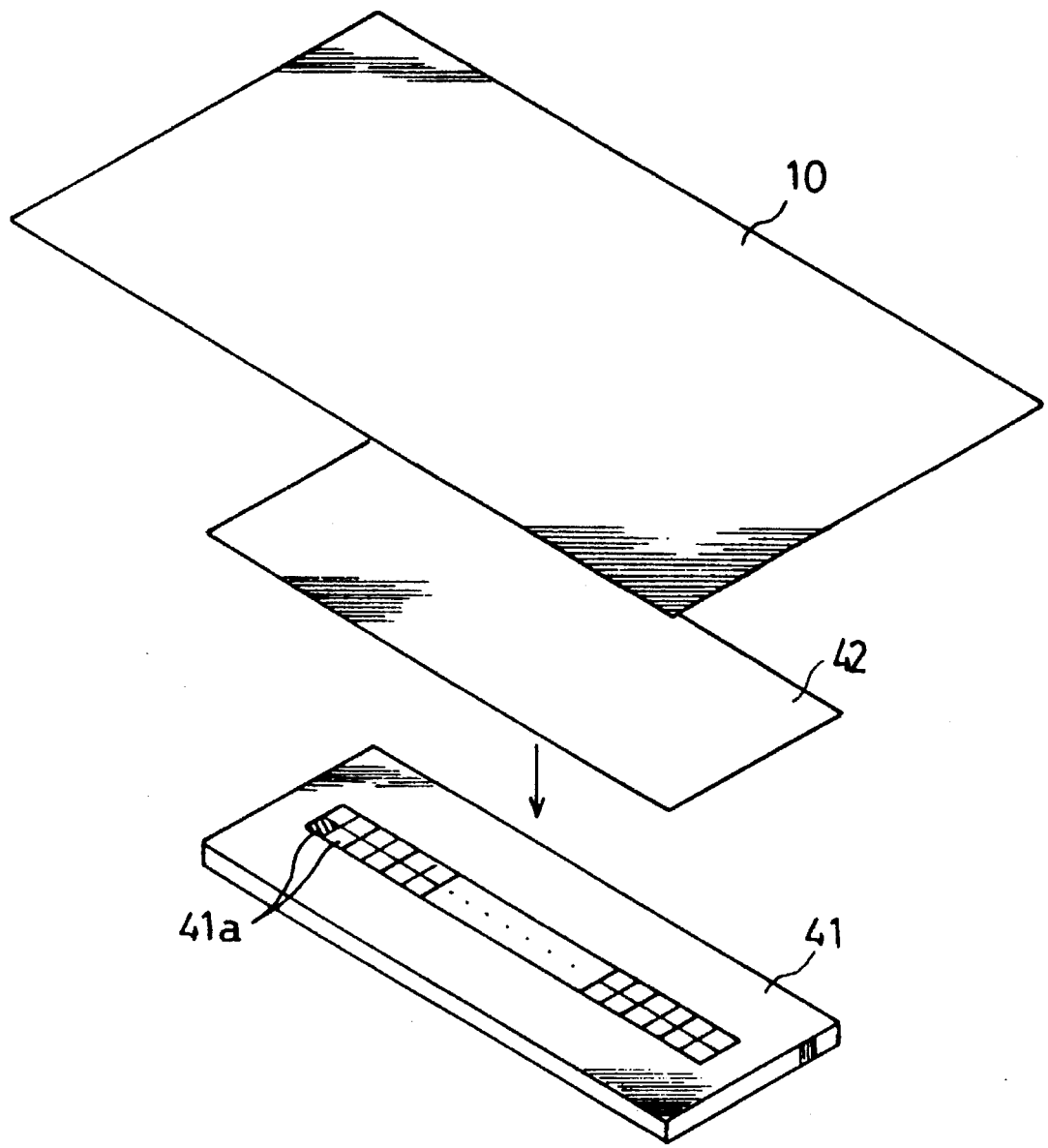
FIG. 6(a) shows a printing method.

Here, the printing section 40 have a thermal head 41 shown in FIG. 6(a) and carries out printing by means of a thermal transferring method. More concretely, the thermal head 41 has minute heat generating elements 41a ... which are arranged in a grid pattern. Then, when the heat generating elements 41a ... are electrically energized with an ink ribbon 42 installed between the thermal head 41 and a sheet 10, ink of the ink ribbon 42 melts so that printing can be carried out on the sheet 10.

Here, the portable image processing apparatus of the present embodiment functions as a portable information reading apparatus by replacing the printing cartridge 3 with a reading cartridge, for example. Here, the reading cartridge is provided with a reading section instead of the printing section 40. As mentioned later, the reading section has an LED for document illumination and a CCD line sensor for document reading, and reads images from a document.

In addition, as shown in FIG. 3, curved dent sections 3c.1c with a same shape are formed at a center of an end surface on a front side (side A of an arrow in the drawing) of the printing cartridge 3 and the apparatus main body 1. As mentioned later, when a sheet is cylindrically installed to a through slit 12 as a gap of the rising section 2, the sheet is set along the curved dent sections 3c.1c, so the sheet can be stably supported (See FIG. 2).

In addition, a battery attachment cover 4 is screwed down on the front end of the apparatus main body 1, and a battery, not shown, is housed in an lower side of the battery attachment cover 4. Here, a battery is housed also in the printing cartridge 3 and the reading cartridge.

Furthermore, a LED 5 for displaying an ON state of a power source in the apparatus main body 1 is provided in the front end of the apparatus main body 1. As shown in FIG. 4, when the rising section 2 rises, the display LED 5 on the bottom of the rising section 2 is interlocked with an operation that a protrusion 6 presses down a power source switch 7 and the display LED 5 is turned ON when the power source of the apparatus main body 1 is turned ON. Moreover, as shown in FIG. 1, a printing start key 38 and a reading start key 39 are provided on the front end of the apparatus main body 1.

Figure 5:
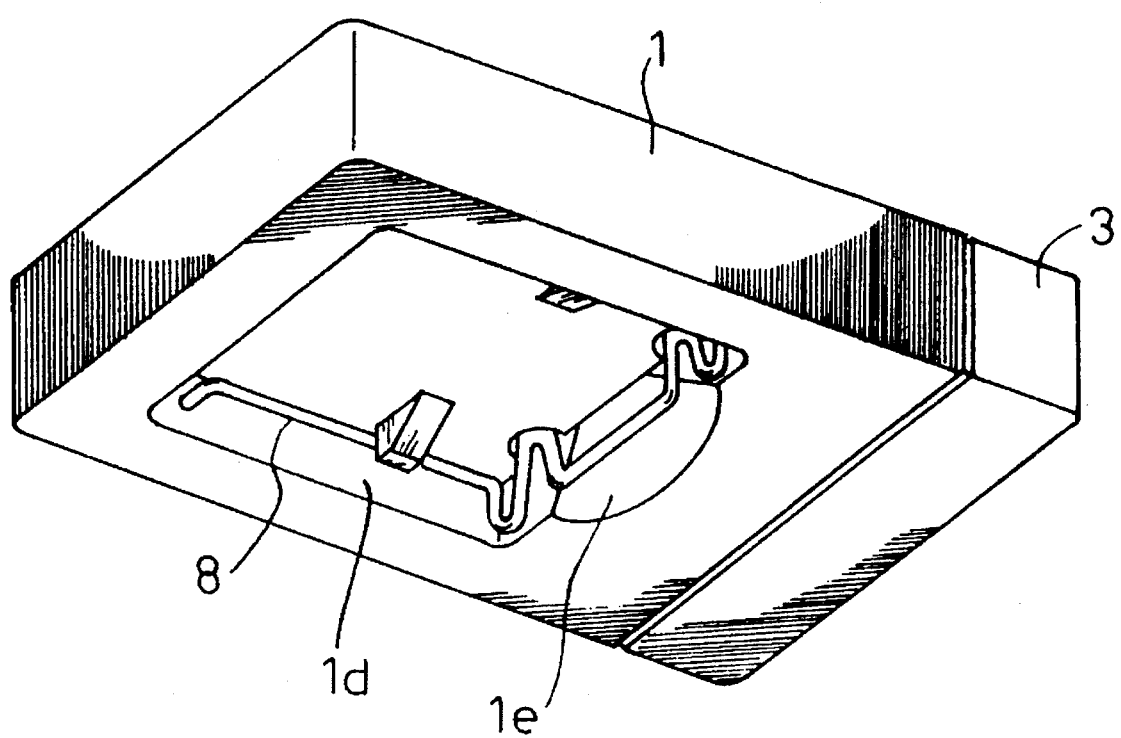
FIG. 5 is a perspective view which shows an arrangement of a bottom surface of the portable image processing apparatus.

Meanwhile, as shown in FIG. 2, a shallow dented section 1d is formed on a rear bottom surface of the apparatus main body 1. As shown in FIG. 5, an L angle 8 is provided in the dented section 1d so that the L angle 8 can be stored. The L angle 8 is pulled out by putting a finger into a cutout section 1e formed on a side of the dented section 1d. The pulled-out L angle 8 is used for hanging the apparatus on a hook on a wall, etc. when the apparatus is not used, or as shown in FIG. 1, it is used as a stand when the apparatus is used.

Next, the following will discuss an arrangement of the rising section 2 in detail.

As shown in FIG. 1, the rising section 2 have a housing 11 and a substantially cylindrical sheet holding section 13. Here, the through slit 12 with an arc-like shape is formed between the housing 11 and the sheet holding section 13.

A printing density adjusting switch 14, a sheet size selecting key 15 and a sheet size display section 16 are provided on a side of the housing 11. The printing density adjusting switch 14 is used for adjusting printing density. The sheet size selecting key 15 is used for inputting a size of sheets, such as A4, B5. Moreover, the sheet size display section 16 is used for displaying a size of sheets selected by the sheet size selecting key 15.

As shown in FIG. 2, a sheet set control 19 is provided at a center of the sheet holding section 13. The sheet set control 19 is rotatable on an axis 20, and it can be switched to a set position and to a release position (See FIG. 1). When the sheet set control 19 is set to the set position, a cylindrical sheet, which is inserted through the through slit 12 is fixed, and when set to the release position, the sheet can be taken out.

In other words, as shown in FIG. 4, three projected sections 19a . . . are provided on a periphery of the sheet set control 19. Moreover, three holding rollers 21.21.21 and roller carriers 22.22.22 for supporting the holding rollers 21.21.21 are placed around the sheet set control 19. The roller carriers 22.22.22 freely moves radially along a guide, not shown, when the projected sections 19a . . . of the sheet set control 19 press the roller carriers 22.22.22.

The sheet set control 19 is linked to a pressure clutch, such as a rotary clutch, not shown, and it can be also manually rotated, but in the present embodiment, when the sheet 10 is inserted into the through slit 12 and the sheet detecting sensor 33 detects the insertion of the sheet 10, as described later referring to FIG. 9, a CPU activate the pressure clutch so that the sheet set control 19 can be rotated.

In addition, as shown in FIG. 4, a sheet carrying section 25 with a substantially doughnut-like shape (solid torus) is provided on an outer circumference of the sheet holding section 13 and inside the housing 11. In other words, a gap between the sheet holding section 13 and the sheet carrying section 25 is the through slit 12. The sheet carrying section 25 has a coil spring 26 therein, and a circumference of the coil spring 26 is coated with a tube member 27. Moreover, a stepping motor for carrying 28 which is fixed on the outer circumference of the sheet holding section is provided in a portion of the solid torus. Both ends of an output axis 28a of the stepping motor for carrying 28 are linked to both ends of the coil spring 26 respectively. As a result, the sheet carrying section 25 is rotated so that its torus rotates from the outer circumference to the inner circumference or from the inner circumference to the outer circumference.

When the sheet set control 19 is in the set position, the projected sections 19a . . . of the sheet set control 19 press the roller carriers 22.22.22. As a result, three roller carriers 22.22.22 and the holding rollers 21.21.21 slide for a fixed amount outwards in radial direction of the sheet holding section 13, and the holding rollers 21.21.21 are pressed against the sheet carrying section 25.

Meanwhile, when the sheet set control 19 is rotated to the release position, three roller carriers 22.22.22 and the holding rollers 21.21.21 slide in a center direction by energizing power of the springs 29 . . . provided to the roller carriers 22.22.22. As a result, the pressing of the holding rollers 21.21.21 against the sheet carrying section 25 is released, and the through slit 12 is in a through state.

Therefore, when the sheet 10 is inserted into the through slit 12 and the sheet set control 19 is set to the set position so that the sheet 10 is caught between the holding rollers 21.21.21 and the sheet carrying section 25, the sheet 10 is carried by driving the stepping motor for carrying 28 so as to rotate the torus of the sheet carrying section 25.

Meanwhile, as shown in FIGS. 2 and 4, a stepping motor for scanning 30 is provided to the sheet holding section 13, a pinion gear 31 of the stepping motor for scanning 30 is engaged with an internal gear 32 fixed to an inner wall of the housing 11 through gear assembly. Then, the sheet holding section 13 is rotated on the axis 20 along an inner circumference of the housing 11 by driving of the stepping motor for scanning 30. Here, at this time, the sheet carrying section 25 is also rotated together with the sheet holding section 13. Moreover, as shown in FIG. 2, when the sheet holding section 13 is rotated, a guide 17 which is projected from the sheet holding section 13 towards the back side (side B of the arrow) is guided by a guide slot 18 formed on the housing 11 so that the sheet holding section 13 is stably supported.

The following will discuss a series of operations for holding, rotating and carrying the sheet 10 in the portable image processing apparatus with the above arrangement.

First, as shown in FIG. 1, when the sheet set control 19 of the rising section 2 is in the release position, the cylindrical sheet 10 is inserted into the through slit 12 from the front side to the back side, namely, in direction B of the arrow. As a result, the sheet detecting sensor 33 (see FIG. 3) provided below the sheet holding section 13 detects the insertion of the sheet 10, and a sheet detecting switch, not shown, is turned ON. When the sheet detecting switch is turned ON, the stepping motor for carrying 28 is activated and the sheet carrying section 25 is rotated. Then, the sheet 10 is drawn in for a fixed amount towards the direction B of the arrow.

Successively, the sheet set control 19 is automatically rotated to the set position, the sheet 10 is caught between the sheet carrying section 25 and the holding rollers 21.21.21 of the sheet holding section 13 so as to be held.

Figure 7:
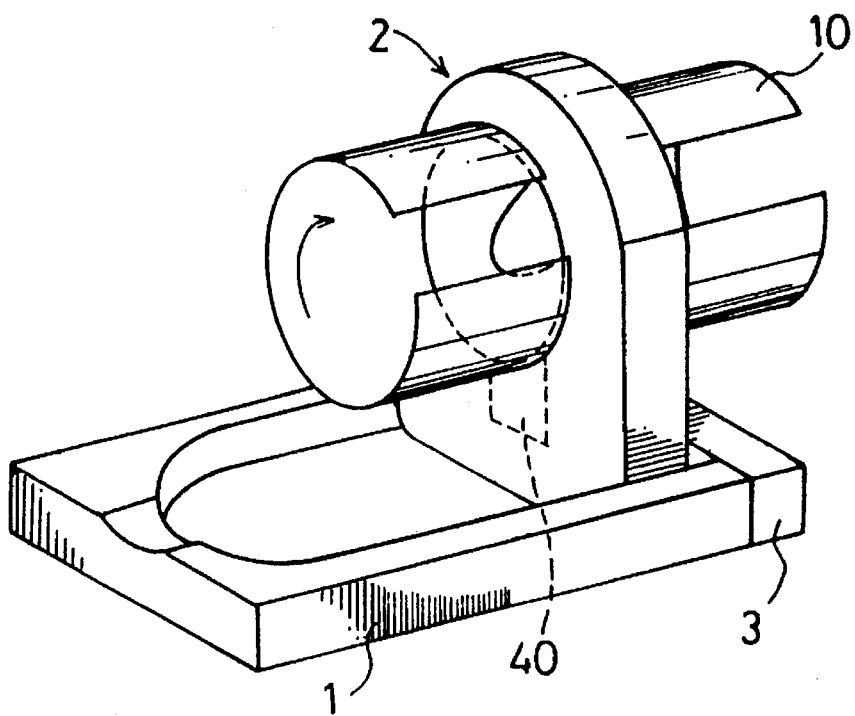
FIG. 7 is a perspective view which shows a holding state of a sheet in the portable image processing apparatus.
Figure 8A:
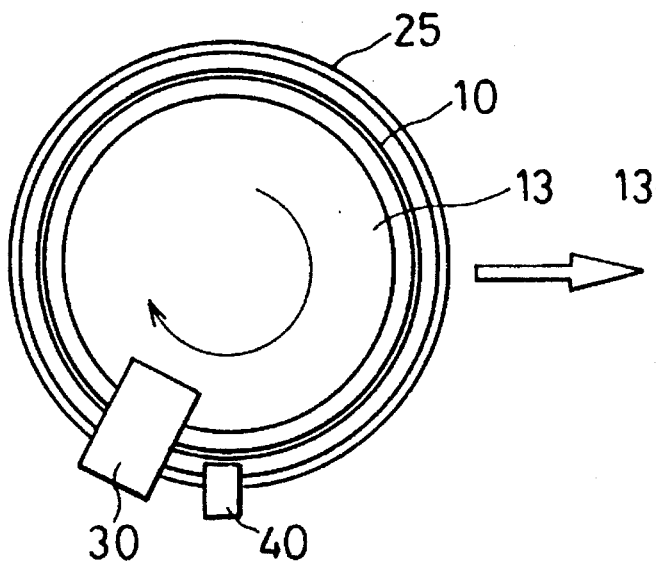
FIG. 8(a) shows a state that a sheet holding section which holds a sheet is rotated from a home position.
Figure 8B:
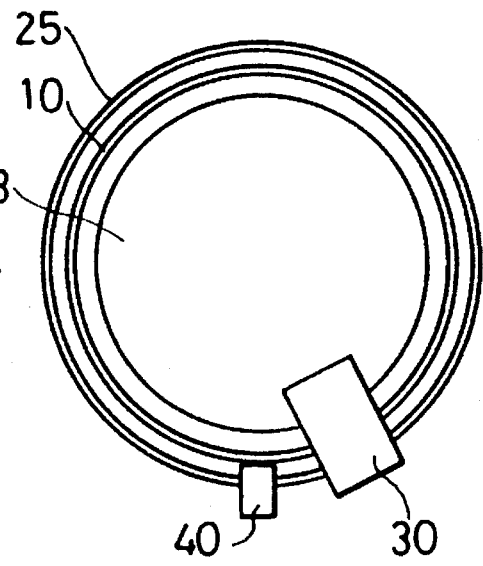
FIG. 8(b) shows a state that the sheet holding section rotates once.

When the stepping motor for scanning 30 is activated in the above state, as shown in FIGS. 7, 8(a) and 8(b), the sheet carrying section 25 and the sheet holding section 13 is rotated together in a circumferential direction with them holding the sheet 10. Here, as a result, as shown in FIGS. 8(a) and 8(b), the printing section 40 (or reading section, not shown) transfers relatively with respect to the sheet 10. This transfer is referred to as scanning.

Meanwhile, when the sheet carrying section 25 is driven by the stepping motor for carrying 28 shown in FIG. 4 so as to be rotated from the outer circumference to the inner circumference or from the inner circumference to the outer circumference, the sheet 10 is carried to a vertical direction of the drawing plane of FIG. 4.

Here, in the present embodiment, when in FIG. 4, the stepping motor for scanning 30 is rotated clockwise, the sheet holding section 13 is rotated counterclockwise so as to be able to carry out counterclockwise scanning, whereas when the stepping motor for scanning 30 is rotated counterclockwise, the sheet holding section 13 can carry out clockwise scanning. The sheet holding section 13 is rotated clockwise and counterclockwise by turns. Meanwhile, when the stepping motor for carrying 28 is rotated counterclockwise in FIG. 2, the sheet 10 can be carried to the direction B of the arrow.

Next, the following will describe a control section of a portable printer of the present embodiment.

Figure 9:
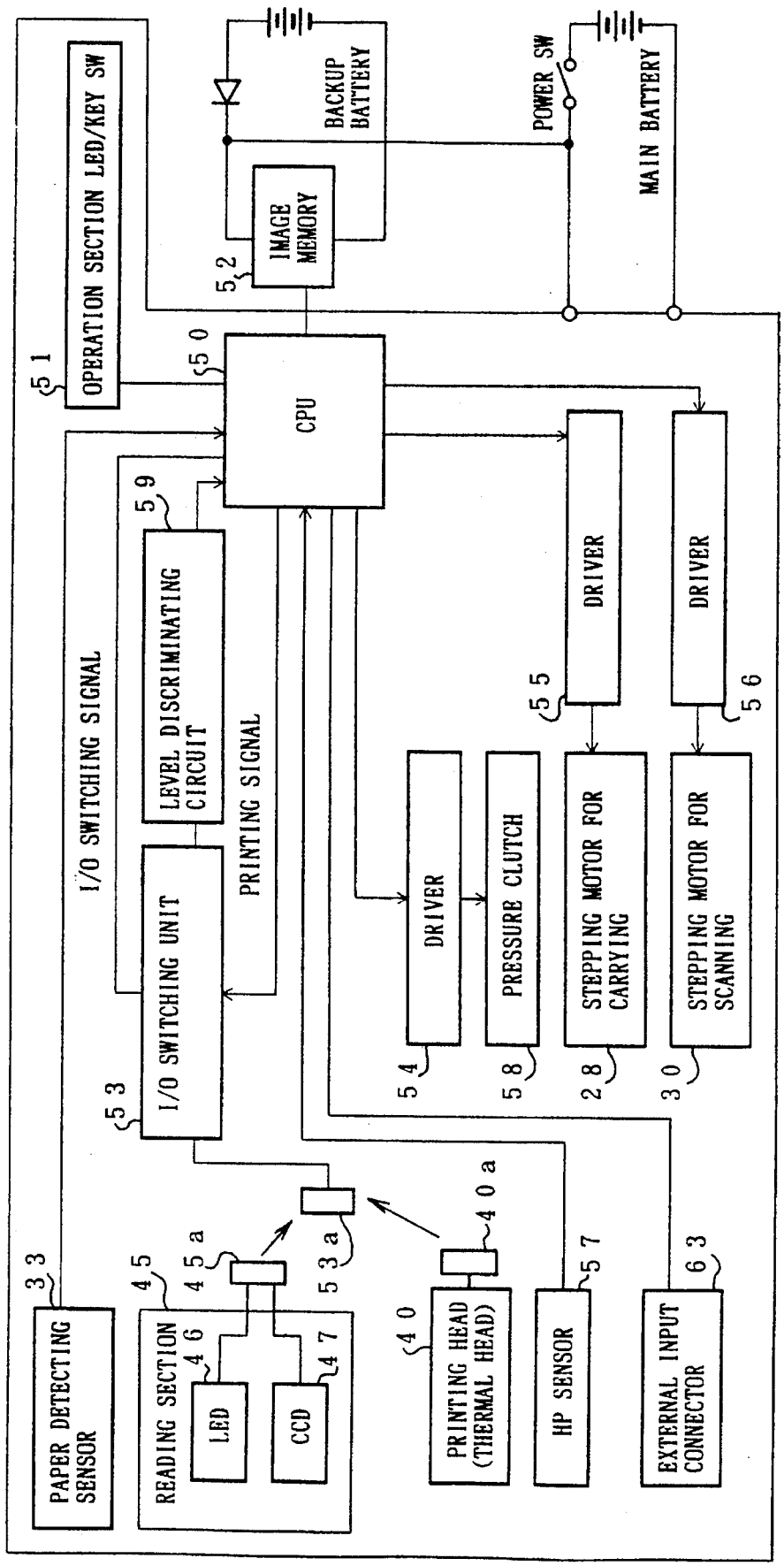
FIG. 9 is a block diagram which shows an arrangement of a control section in the portable image processing apparatus.

As shown in FIG. 9, the control section has a CPU 50, and an operation section 51, an I/O switching unit 53, drivers for driving various loads 54.55.56, the sheet detecting sensor 33, a home position (HP) sensor 57, an external input connector 63, an image memory 52, etc. are connected to the CPU 50.

The operation section 51 is composed of operation keys, such as the sheet size selecting key 15, a display LED 5 for displaying an ON state of a power source, etc. mentioned above.

In addition, the driver 54 is connected to the pressure clutch 58 for fixing the sheet 10 (linked to the sheet set control 19), whereas the drivers 55 and 56 are connected to the stepping motor for carrying 28 and the stepping motor for scanning 30 respectively.

In addition, the printing section 40 or a reading section 45 is connected to a connector 53a provided to the I/O switching unit 53 through connectors 40a.45a. The I/O switching unit 53 switches a signal inputted/outputted from the connector 53a.

The reading section 45 has an LED 46 for illuminating documents and a CCD line sensor 47 for reading documents as mentioned above, and the reading section 45 reads documents. An analog signal which is an output of the CCD line sensor 47 is converted into a digital signal through a level judging circuit 59 which is provided between the I/O switching unit 53 and the CPU 50 and is outputted to the CPU 50.

Here, the following will describe in detail a control for switching connection by judging the reading section 45 or the printing section 40 in the case where the reading cartridge or the printing cartridge is attached to the portable image processing apparatus of the present embodiment.

Figure 10:
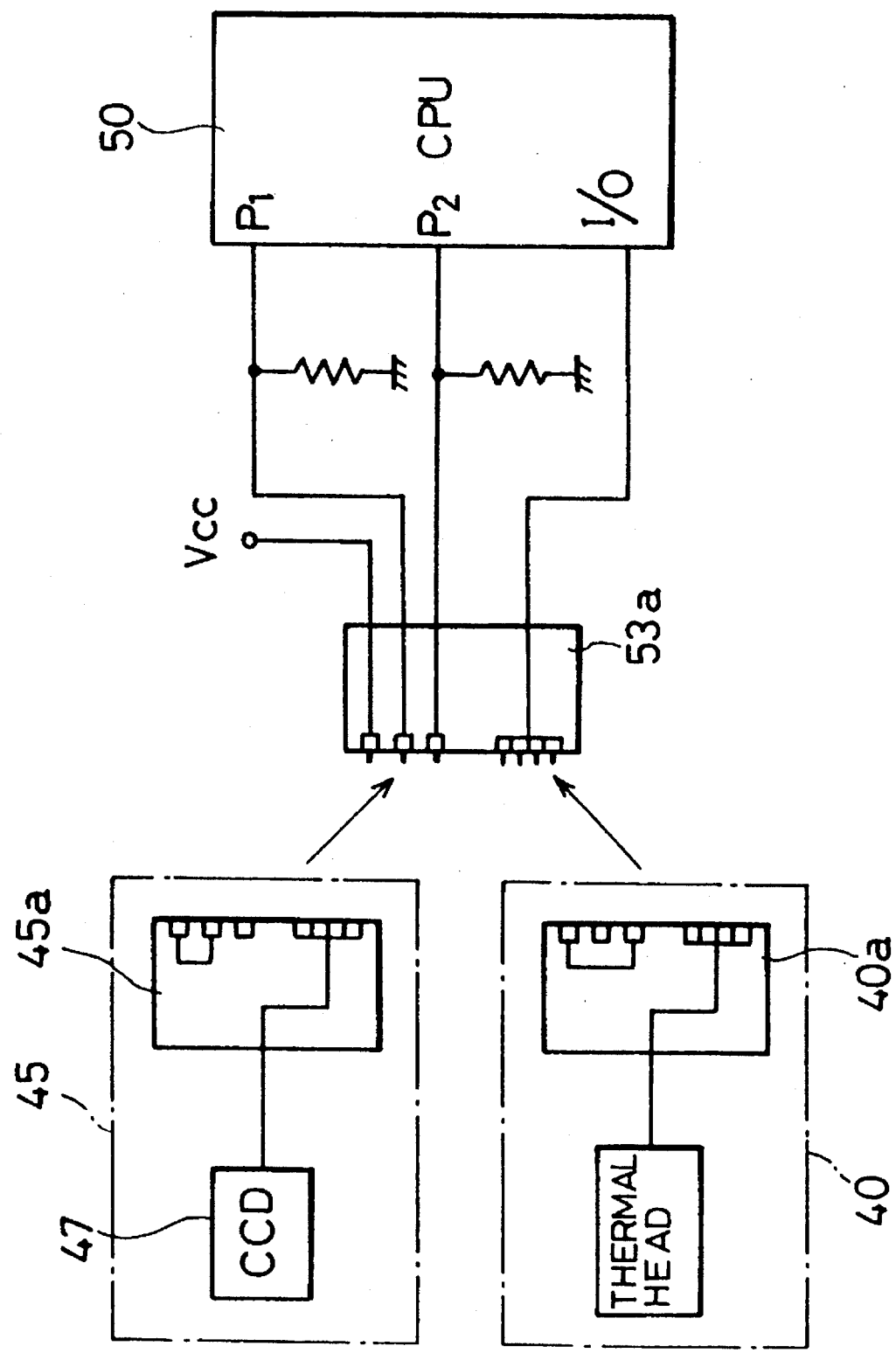
FIG. 10 is an explanatory drawing which shows an attachment mechanism of a printing section and a reading section in the portable image processing apparatus.
Figure 11:
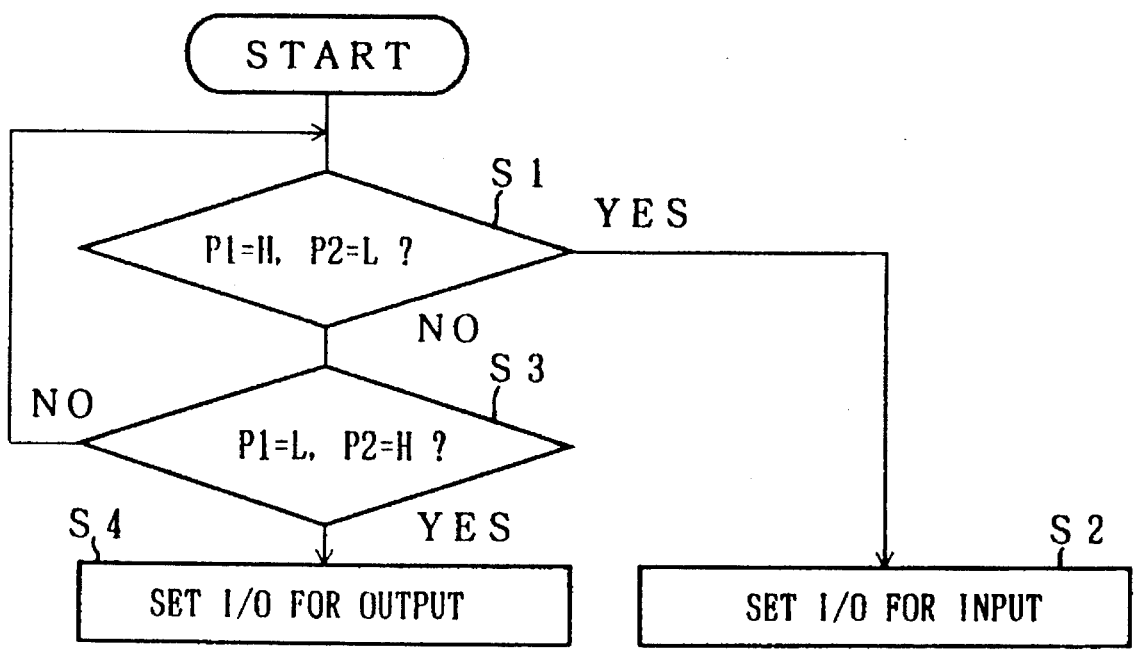
FIG. 11 is a flow chart which shows an operation of an CPU in the attachment mechanism of the printing section and the reading section.

As shown in FIG. 10, a P1 terminal, a P2 terminal and a VCC terminal for checking ID are provided from the connector 53a on main body side. In the case where the reading section 45 is connected to the connector 53a, since the connector 45a on the reading section 45 side shorts the VCC terminal and the P1 terminal, the P1 terminal of the CPU 50 is in "H" state and the P2 terminal is in "L" state. As a result, as shown in FIG. 11, the CPU 50 detects that the reading section 45 is connected (S1), setting of a port, such as switching of I/O, specifying of an address is made so that an input signal from the CCD line sensor 47 is received from the I/O port (S2).

Meanwhile, in the case where the printing section 40 is connected to the connector 53a, as shown in FIG. 10, the connector 40a on the printing section 40 side shorts the VCC terminal and the P2 terminal. For this reason, reversely, the P1 terminal is in "L" state and the P2 terminal is in "H" state. Similarly, the CPU 50 detects this, and as shown in FIG. 11, the CPU 50 detects that that the printing section 40 is connected (S3), setting of a port, such as switching of I/O, specifying of an address is made so that printing data to the printing section 40 is outputted from the I/O port (S4).

Figure 12:
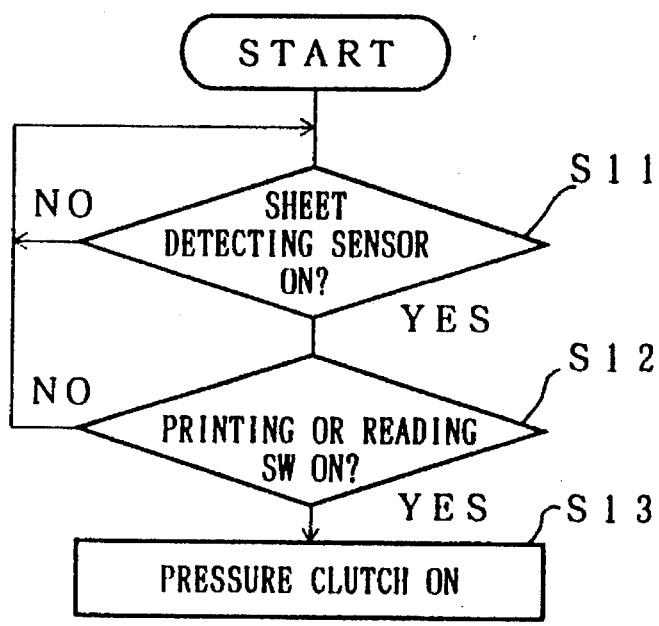
FIG. 12 is a flow chart which shows an operation of the CPU for operating a pressure clutch in the portable image processing apparatus.

Meanwhile, as shown in FIG. 4, the sheet detecting sensor 33 is provided below the sheet holding section 13 with it contacting with the sheet carrying section 25. When the sheet 10 is inserted into the through slit 12, the sheet detecting sensor 33 detects the insertion of the sheet and turns ON the sheet detecting switch, not shown. Moreover, at the same time, the CPU 50 activates the pressure clutch 58 and controls the sheet set control 19 so that the sheet set control 19 is switched to the set position. In other words, as shown in FIG. 12, the CPU 50 judges whether the sheet detecting sensor 33 is turned ON or not (S11) and detects whether the printing switch or the reading switch is turned ON or not (S12). Then, when the sheet detecting sensor 33 and the printing switch (or the reading switch) are both turned ON, the CPU 50 drives the pressure clutch 58 and switches the sheet set control 9 to the set position (S13).

Here, as the sheet detecting sensor 33, an actuator of a reed switch can be used, for example. In this case, as the CPU 50, one with a standing-by function can be used.

Figure 13:
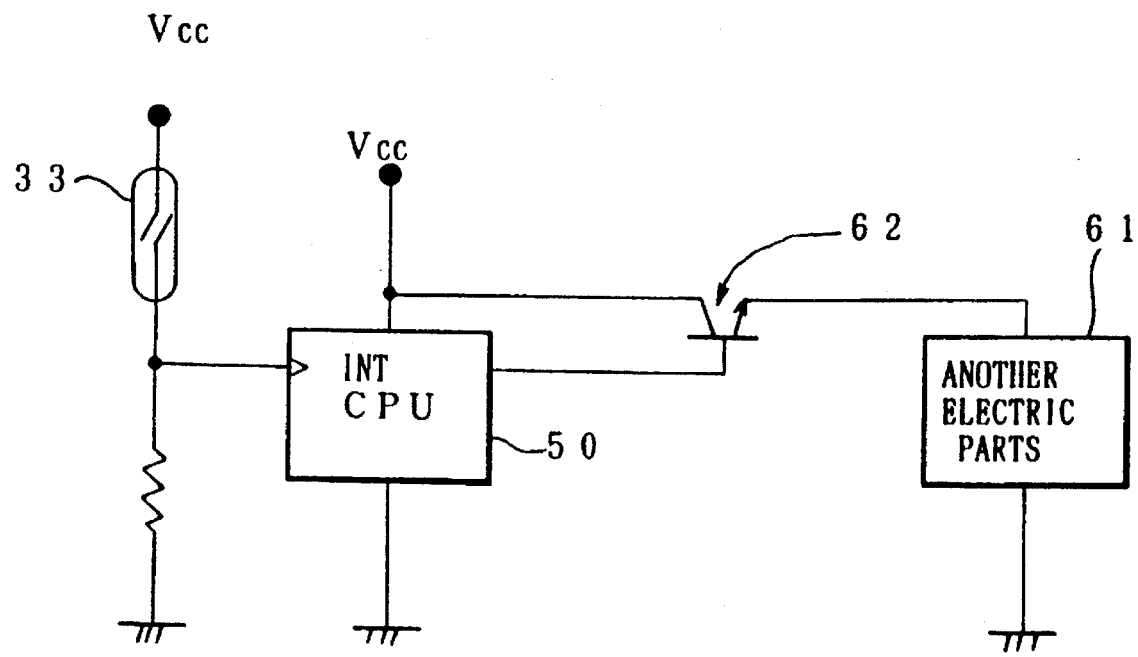
FIG. 13 is a block diagram which shows a control of a sheet detecting sensor in the portable image processing apparatus.

In the case where the sheet detecting sensor 33 is used, after completion of the operation, the CPU 50 is in a standing-by state by HALT (stop) command, the operation is resumed by an interrupt. Therefore, as shown in FIG. 13, in the case where the sheet detecting sensor 33 is connected to an interrupt input port of the CPU 50, when the sheet 10 is inserted, an interruption occurs in the CPU 50. When the CPU 50 turns ON a power supplying transistor 62 for supplying power to another electric parts 61, all the power sources of the electric parts 61 are turned ON and the operation is enable for resuming.

In addition, when the printing operation is completed and the sheet 10 is pulled out of the sheet carrying section 25, the CPU 50 detects that the sheet 10 is pulled out according to a signal from the sheet detecting sensor 33 and turns the power OFF. Namely, the CPU 50 turns OFF the power supplying transistor 62. As a result, another electric parts 61 are turned OFF and the CPU 50 is brought to the standing-by state for itself.

Here, in the above situation, it is needless to say that the sheet detecting sensor 33 can be used itself as a power source switch.

Meanwhile, as shown in FIG. 9, the home position (HP) sensor 57 detects whether the sheet holding section 13 is in its home position (HP) (see FIG. 4) or not, and it is composed of a photo interrupter, etc., for example.

In addition, the external input connecter 63 is provided for communication with a personal computer, etc. in the case where the portable image processing apparatus of the present embodiment is used as a printer of the personal computer.

Next, the following will discuss an image memory 52 which is included in the portable image processing apparatus of the present embodiment in order to store image data together with an arrangement of the CCD line sensor for reading image data, etc.

The CCD line sensor 47 outputs a level of density of image data read from a document to the level judging circuit 59 as an analog data. The level judging circuit 59 determines "1 (print)" or "0 (do not print)" per picture element on the basis of a prescribed threshold. In other words, when a level of density of a read picture element is higher than the threshold, "1" is stored in the image memory 52 as data of 1 bit, and when lower than the threshold, "0" is stored.

Here, the above-mentioned 1 picture element is a minimum unit which can be read by the CCD line sensor 47. Moreover, 1 line is an amount of data which can be read at a time while the CCD line sensor 47 stops. In the present embodiment, the CCD line sensor 47 with resolution of 8 picture elements/mm and a reading width of 10 mm is used. Namely, a range in which a document can be read while the CCD line sensor 47 stops is 0.125 mm×10 mm. Moreover, since the 10÷0.125=80 picture elements are read out according to the above range, 1 line which is read while the CCD line sensor 47 stops is stored in the image memory 52 as data of 80 bits, namely, 10 byte.

Here, the image memory 52 has a capacity which is capable of storing image data for a sheet with a maximum size which can be used in the portable image processing apparatus of the present embodiment. For example, if a usable maximum size of a sheet is A4 (210 mm×297 mm), when a widthwise direction of the sheet is a scanning direction, the CCD line sensor 47 completes 1 scanning by repeating a reading operation 1680 times (=210÷0.125) in this scanning direction. The image data obtained at this time are stored in the image memory 52 as data of 16.8K bytes (=10 bytes×1680).

In addition, the lengthwise direction of the A4 sheet becomes a carrying direction, so in order to read an image on the whole sheet, it is necessary to repeat the scanning operation in the carrying direction 30 times (≅297÷10). For this reason, capacity which is required by the image memory 52 in order to store image data for one A4 sheet is 504K bytes (=16.8K bytes×30).

Figure 14:
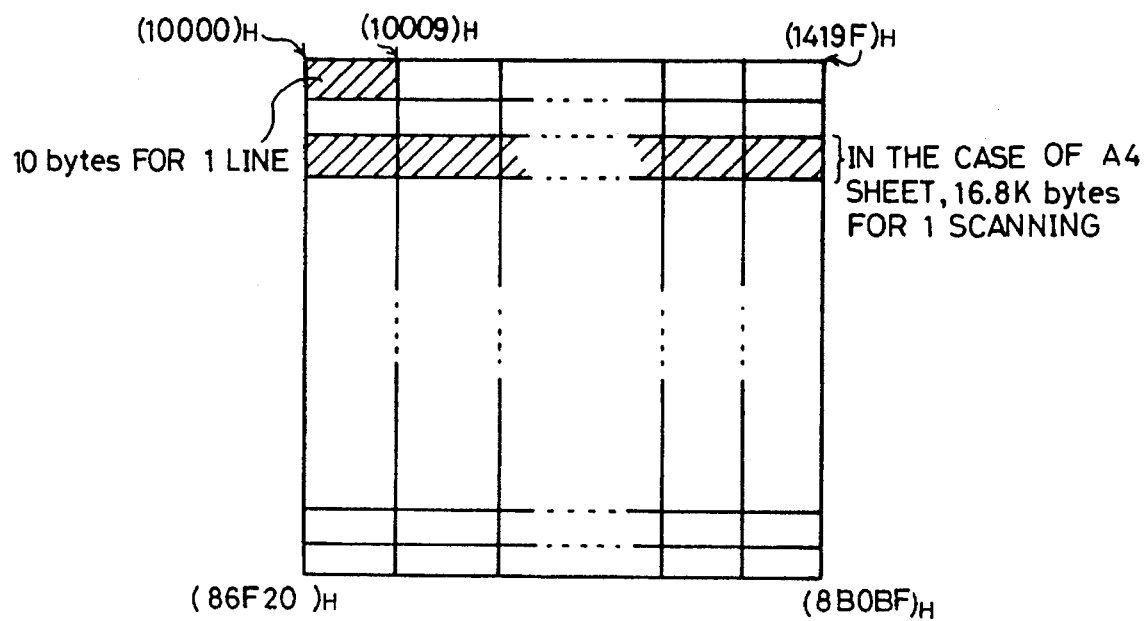
FIG. 14 is an explanatory drawing which shows a storage system of an image memory in the portable image processing apparatus.

FIG. 14 is a memory map which schematically shows a storing state of data to the image memory 52. As shown in the drawing, the image data read by the CCD line sensor 47 are stored in the image memory 52 per 1 line, namely, 10 byte. Moreover, as shown in the drawing, data of 16.8K bytes obtained by the first 1 scanning are stored in area of address (hexadecimal) 10000 to 1419F in the image memory 52, for example. Moreover, the image data of the whole A4 sheet are stored in area of the address (hexiadecimal) 10000 to 8B0BF.

Here, in the case where a portable printer as the portable image processing apparatus of the present embodiment is used as a printer of the personal computer, etc., since character data which are handled in a personal computer, etc. are generally stored as character codes, it is necessary to convert the character codes into image data so as to transmit them to the image memory 52. However, character codes varies with kinds of personal comruputers, etc., in the present embodiment, the converting operation is carried out by the personal computer. Moreover, the converted data are transmitted to the image memory 52 and are stored therein with them having a same format as of an image data storing method shown in FIG. 14.

Figure 16:
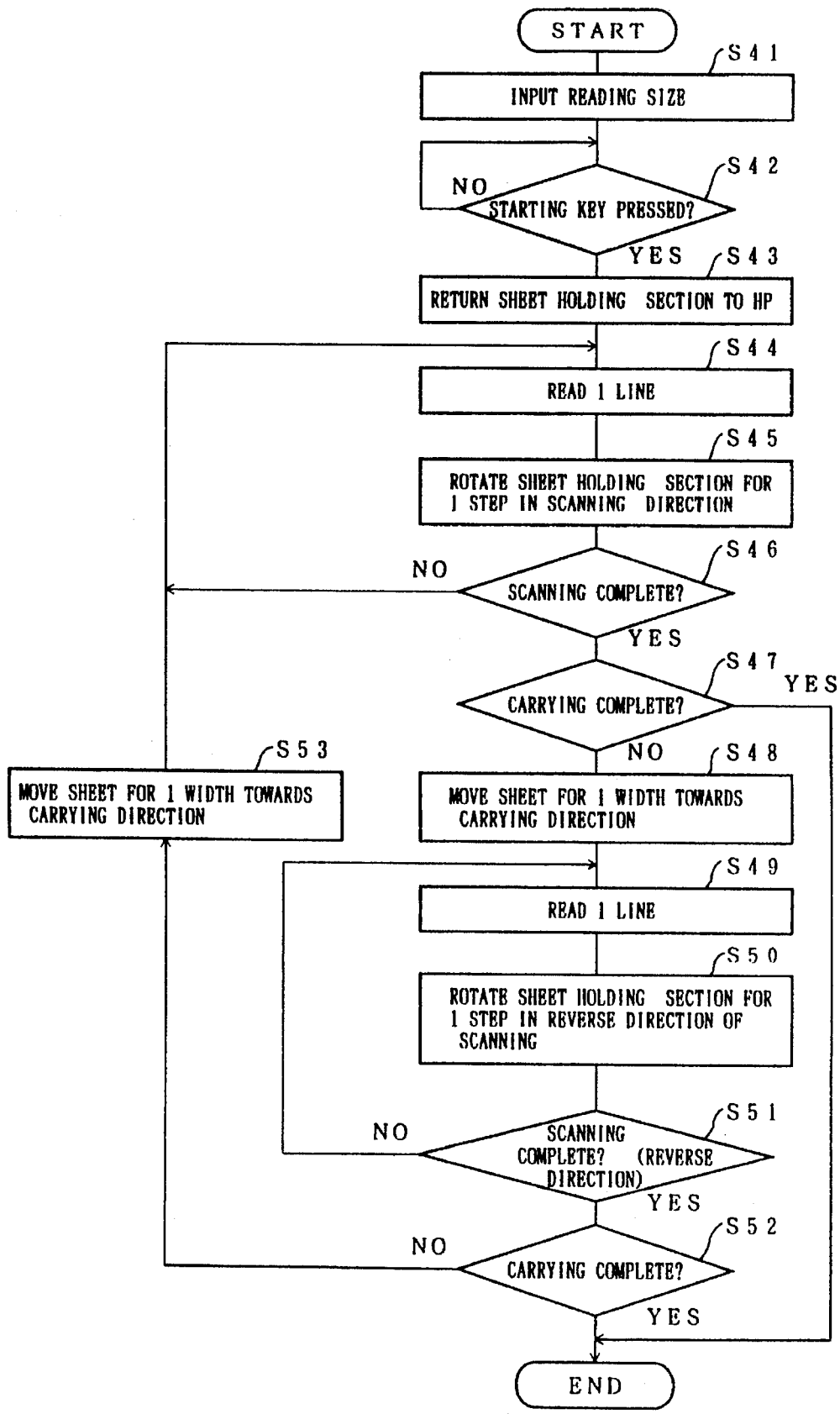
FIG. 16 is a flow chart which shows a reading operation of the portable image processing apparatus.

Here, the following will describe an operation in the case where the portable image processing apparatus of the present embodiment to which a reading cartridge is attached is used as a portable information reading apparatus referring to a flow chart in FIG. 16.

First, an operator sets a sheet 10, and inputs a sheet size, such as A4 or B5 using the sheet size selecting key 15. As a result, dimensions of a scanning direction and a carrying direction in which reading should be carried out are set (S41). Successively, when the operator presses the reading start key 39 (S42), the sheet holding section 13 is returned to the home position (HP) (see FIG. 4) (S43). At this time, the LED 46 for illuminating a document is turned ON.

Figure 17:
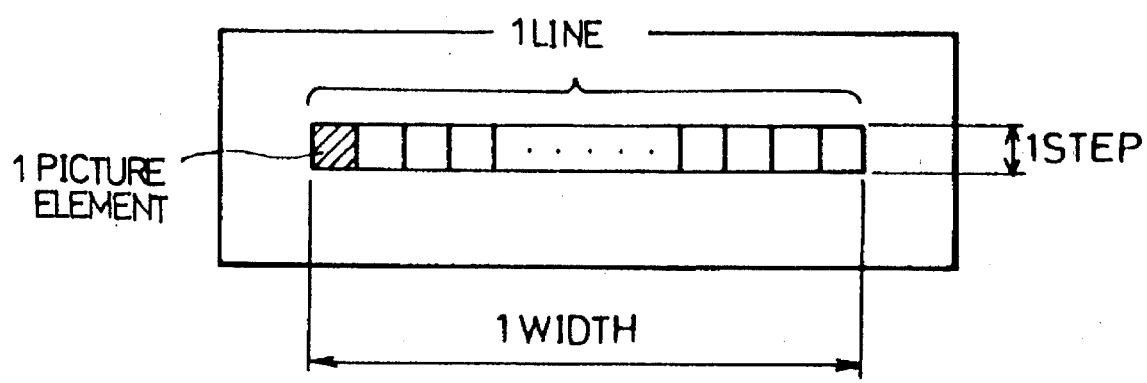
FIG. 17 is an explanatory drawing which shows a size of an image to be read by the reading section of the portable image processing apparatus.

Successively, the reading operation is ready. First, data for 1 line of the CCD line sensor 47 are read (S44). Next, the stepping motor for scanning 30 is pulsatively driven, and the sheet holding section 13 is rotated for 1 step in the scanning direction (S45). Here, as shown in FIG. 17, 1 step corresponds to a width of one picture element of the CCD line sensor 47, in the present embodiment, it is 0.125 mm. The sequences S44 and S45, namely, an operation for rotating the sheet holding section 13 for 1 step every time document data are read for 1 line is repeated until a transferring amount in the scanning direction reaches the reading size in the scanning direction which has been inputted at S41 (S46).

When after completion of S46, if the transferring amount in the carrying direction of the sheet 10 does not reach the reading size in the carrying direction inputted at S41 yet (S47), the sheet 10 is carried for 1 width (S48). Here, as shown in FIG. 17, 1 width corresponds to a length of 1 line of the CCD line sensor 47, and in the present embodiment it is 10 mm. Successively, this time, while the sheet holding section 13 is being rotated in a reverse direction to at S45, reading of document data is repeated per 1 line in a same manner as at S44 through S46 (S49 through 51). When after completion of S51, if the transferring amount in the carrying direction of the sheet 10 does not reach the reading size in the carrying direction inputted at S41 yet (S52), the sheet 10 is carried for 1 width (S53), and the sequence returns to S44.

The sequences S44 through S53 are repeated, and at S47 or S52, the operation for reading a document is completed at a point in time the transferring amount of the sheet in the carrying direction reaches the reading size in the carrying direction inputted at S41 first.

Figure 15:
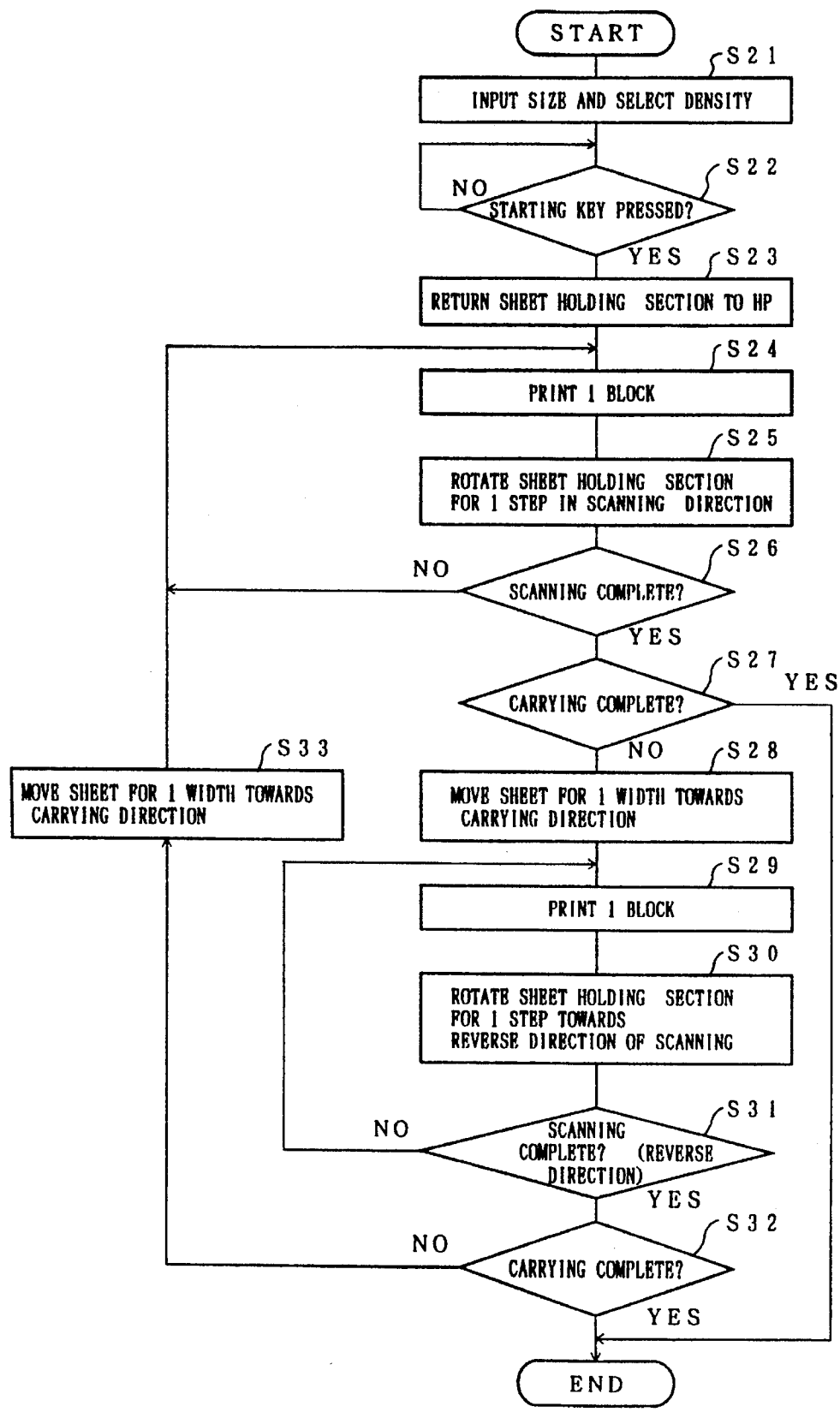
FIG. 15 is a flow chart which shows a printing operation of the portable image processing apparatus.

Next, the following will describe a printing operation in the case where the portable image processing apparatus of the present embodiment to which a printing cartridge 3 is attached is used as a portable printer referring to a flow chart in FIG. 15.

First, an operator inputs a sheet size, such as A4 or B5, using the sheet size selecting key 15. As a result, dimensions in a scanning direction and in a carrying direction in which printing should be carried out are set. Meanwhile, after the setting of a sheet 10 is completed, the operator selects printing density using the printing density adjusting switch 14 (S21).

Successively, when the operator presses the printing start key 38 (S22), the sheet holding section 13 is returned to the home position (HP) (see FIG. 4) (S23), and data for 1 line are taken out from the image memory 52 so that image data for 1 block are printed based the data for 1 line (S24).

Figure 6B:
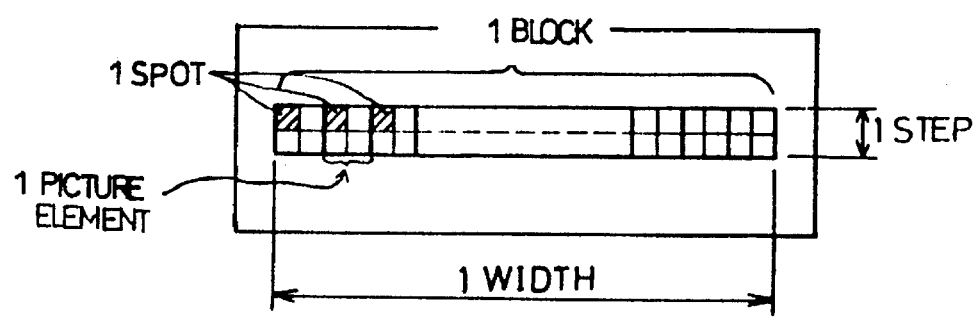
FIG. 6(b) shows an arrangement of 1 block.

Here, the 1 block corresponds to an amount of data which can be printed at a time while the printing section 40 stops, and as shown in FIG. 6(b), the amount of data is obtained by (1 line)×(a number of spots by 1 picture element). Moreover, 1 picture element is a minimum unit in the case of reading in the CCD line sensor 47. Furthermore, a range where printing can be carried out at a time is 0.125×10 mm. Moreover, a spot is a minimum unit where printing is possible and is printed by one heat generating element 41a. A plurality of spots compose 1 picture element. In FIG. 6(b), 1 picture element is composed of 4 spots, and density of the picture element can be gradually shown according to an area ratio of a printing section to a non-printing section in one picture element (a ratio of a number of printing spots to a number of non-printing spots). For example, in order to display 1 picture element, when only 1 spot is used, thinnest printing is obtained, and when 4 spots are used, deepest printing is obtained.

Successively, as shown in FIG. 15, the sheet holding section 13 is rotated for 1 step (S25). Then, the sequences S 24 and S25 are repeated until printing for 1 scanning inputted at S21 is completed (S26). Moreover, when a transferring amount of the sheet 10 does not reach the carrying size inputted at S21 (S27), the sheet 10 is transferred for 1 width (S28). Here, 1 width is 10 mm, for example, in the present embodiment.

Successively, after printing for 1 block is completed (S29), the sheet holding section 13 is rotated in a reverse direction to at S25 this time (S30). Then, the sequences S29 and S30 are repeated until a transferring amount of the sheet 10 reaches a printing size in the scanning direction (S31).

After the sequences S24 and S32 are repeated, when at S27 or S32 a carrying amount of the sheet 10 reaches a carrying size, the printing operation is completed.

In such a manner, in the portable image processing apparatus of the present embodiment, when an image process, such as reading, printing, are carried out, a sheet 10 is cylindrically inserted into the through slit 12 which is between the sheet holding section 13 having a substantially cylindrical shape and the sheet carrying section 25, and the sheet 10 is pressed against the sheet carrying section 25 by the holding rollers 21.21.21 so as to be held. In this state, an image process (namely, reading an image from the sheet 10 or printing on the sheet 10) is carried out in the printing section 40 or the reading section 45 which is provided in an opposite position to the sheet holding section 13. Then, after the image process in a prescribed position is completed, the stepping motor for scanning 30 is driven, and the sheet holding section 13 is rotated on the axis 20 with the sheet 10 held. This makes it possible to repeat the image process in the scanning direction. In this way, when the image process for the first line is completed, the sheet 10 is transferred in a parallel direction with the axis 20 of the sheet holding section 13 by rotation of the sheet carrying section 25. This makes the image process for the second line possible. When the scanning by the rotation of the sheet holding section 13 which holds the sheet 10 and the carrying of the sheet 10 by the sheet carrying section 25 are repeated, the image process on the whole sheet 10 is possible.

As a result, a width in the carrying direction in the sheet holding section 13 can be substantially same as a necessary width of the printing section 40. Moreover, in the scanning direction, since a cylindrically held sheet is transferred relatively in the printing section 40 or the reading section 45 by rotation of the sheet holding section 13, a size of the scanning direction of the sheet holding section 13 can be also miniaturized smaller than a sheet size. These are effective in improving portability of an apparatus.

In addition, the sheet holding section 13, the holding rollers 21.21.21, the sheet carrying section 25, the printing section 40, the stepping motor for scanning 30 and the sheet carrying section 25 unit are formed so as to be freely raised from (in a raised position with respect to the apparatus main body 1) and lowered in (in a stored position that the rising section 2 is stored in the apparatus main body 1) the apparatus main body 1. For this reason, in the stored position, the whole apparatus has less projected portions and its portability is improved, thereby decreasing a possibility of damage to the apparatus.

In addition, since the printing section 40 and the reading section 45 are formed as a replaceable cartridge type, functions can be easily switched only by replacing the printing section 40 with the reading section 45 and vice versa, both of which occupy a small portion of the whole apparatus, in the apparatus main body 1. As a result, an apparatus having excellent portability and multifunctions can be realized.

In addition, in the case where the sheet 10 is held, the sheet 10 is inserted into the through slit 12, which is formed between the sheet carrying section 25 having a doughnut-like shape provided in the outer circumference of the sheet holding section 13 and the plural holding rollers 21.21.21 which are provided inside the sheet holding section 13 and which are freely moved radially. Successively, the plural holding rollers 21.21.21 are simultaneously moved outward in a radial direction by the sheet set control 19 provided at a substantially center portion in a cylinder.

As a result, the sheet 10 is caught between the sheet carrying section 25 and the plural holding rollers 21.21.21. As a result, since the plural holding rollers 21.21.21 are simultaneously moved by the sheet set control 19, each section of the sheet 10 can be uniformly pressed. Therefore, since the sheet 10 can be held in the outer circumference of the sheet holding section 13 without being deflected, lack and displacement of an image are prevented, thereby making it possible to improve quality of an image process.

In addition, in the present embodiment, in the case where the printing section 40 is replaced with the reading section 45 and vice versa, the CPU 50 judges which section is connected, and the printing process or the reading process is automatically selected. For this reason, an operator may only attaches a cartridge having the printing section 40 or the reading section 45, so trouble of switching a process mode is saved. As a result, mis-operation is prevented, thereby making it possible to improve operability.

In addition, in the portable image processing apparatus of the present embodiment, the apparatus main body 1 is automatically turned ON by striking the power source switch 7 when the rising section 2 rises. For this reason, since the apparatus main body 1 is automatically turned ON in the raised position which means in-use state, it is not necessary to additionally provide a power source switch on the surface of the apparatus main body 1, so the apparatus can be immediately in a usable state by taking-in/taking-out operation.

In addition, in the present embodiment, the sheet detecting sensor 33 for detecting insertion of the sheet 10 is provided, and the CPU 50, which operates the sheet carrying section 25 in order to carry the sheet 10 to an image process starting position based upon an output signal from the sheet detecting sensor 33, is provided. For this reason, since the sheet 10 is carried to a position where an end of the sheet 10 can undergo the image process, the sheet 10 is easily inserted to the image process starting position.

In addition, in the present embodiment, various electric parts 61 attached to the portable image processing apparatus are turned ON according to an output signal from the sheet detecting sensor 33 so that the apparatus can get ready to start the operation. For this reason, excessive power consumption can be held down by turning ON the various electric parts 61 only in the case where the apparatus is essentially used, thereby making it possible prolong usable time of the apparatus at the time of carrying the apparatus.

In addition, in the present embodiment, the sheet set control 19 is rotated based upon detection of the sheet 10 by the sheet detecting sensor 33 so that the sheet 10 is held by pressing of the holding rollers 21.21.21. For this reason, the sheet 10 can be automatically held.

EMBODIMENT 2

The following will discuss another embodiment of the present invention referring to FIGS. 18 through 23. Here, for convenience of explanation, those members that have the same arrangement and functions, and that are described in the aforementioned embodiment are indicated by the same reference numerals and the description thereof is omitted.

Figure 18:
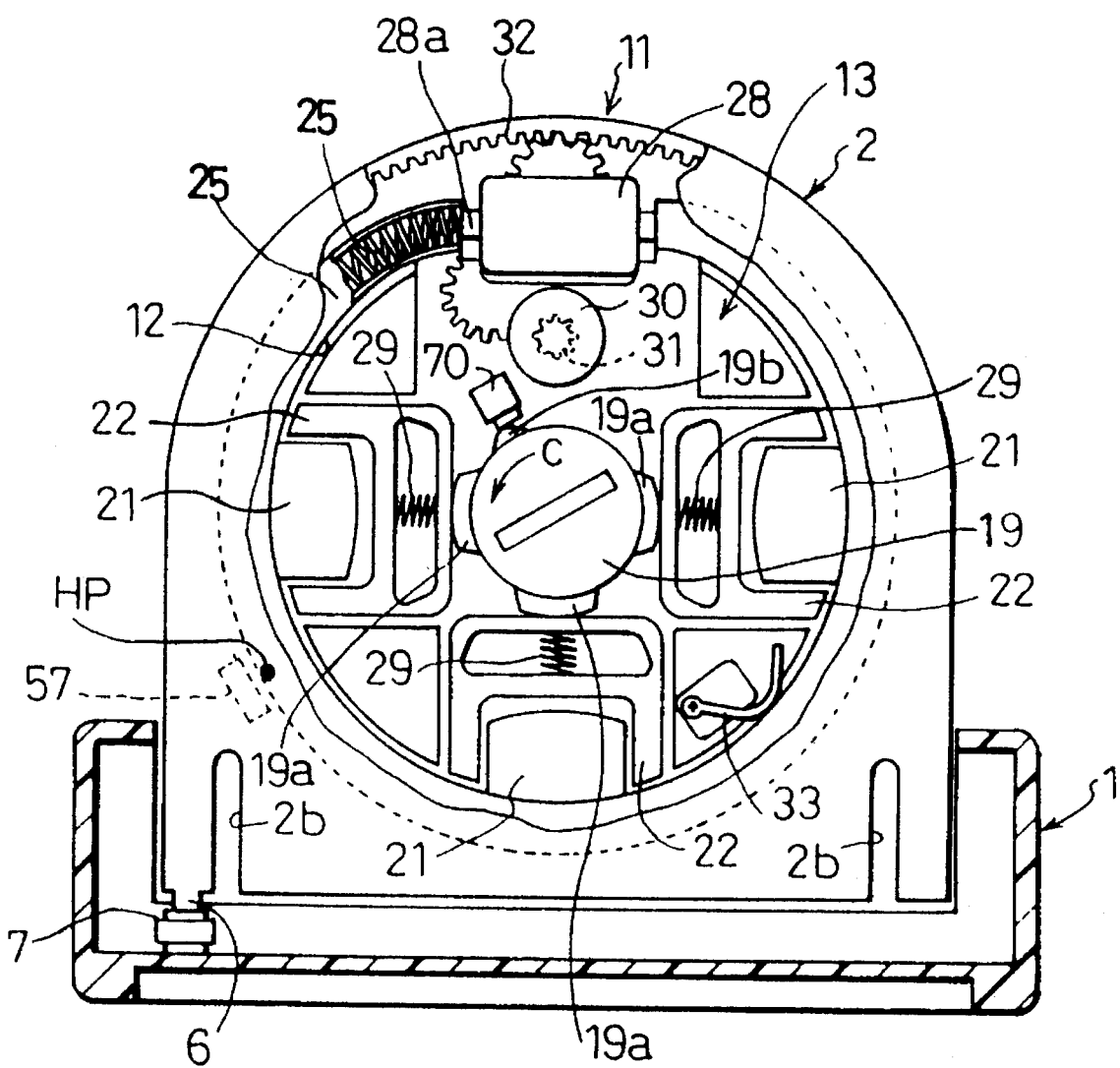
FIG. 18 is a front-sectional view which shows a part of a portable image processing apparatus in another embodiment of the present invention by fracturing the apparatus.

As shown in FIG. 18, a portable image processing apparatus of the present embodiment is provided with a protrusion 19b except for three projected sections 19a . . . on an outer circumference of the sheet set control 19. Moreover, a power source switch 70 is provided in a proximity of the protrusion 19b.

When a sheet set control 19 is rotated in a direction C of an arrow and three projected sections 19a . . . press roller carriers 22.22.22, the protrusion 19b presses the power source switch 70 so that an apparatus main body 1 is turned ON.

In addition, in the portable image processing apparatus of the present embodiment, a rising section 2 keeps its raised position at a prescribed range of angle to the apparatus main body 1.

Figure 19A:
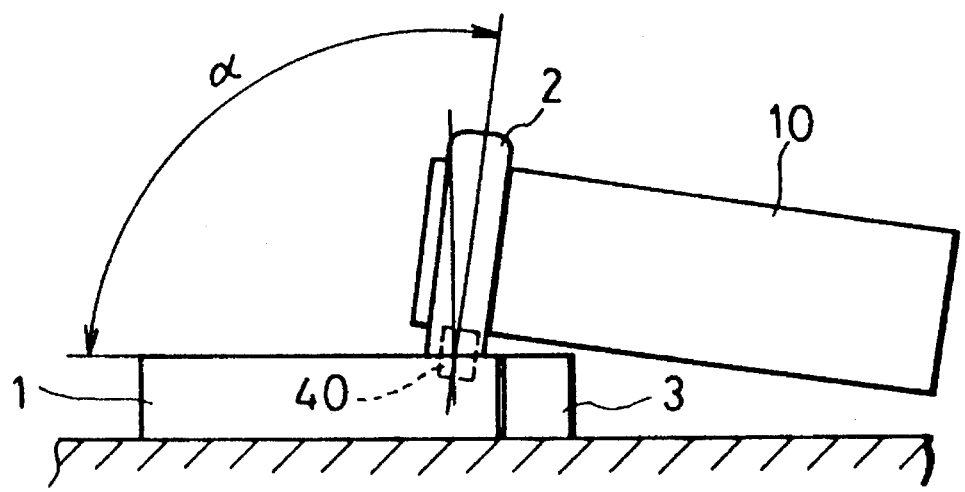
FIG. 19(a) shows a state that an image process on a sheet is almost completed.
Figure 19B:
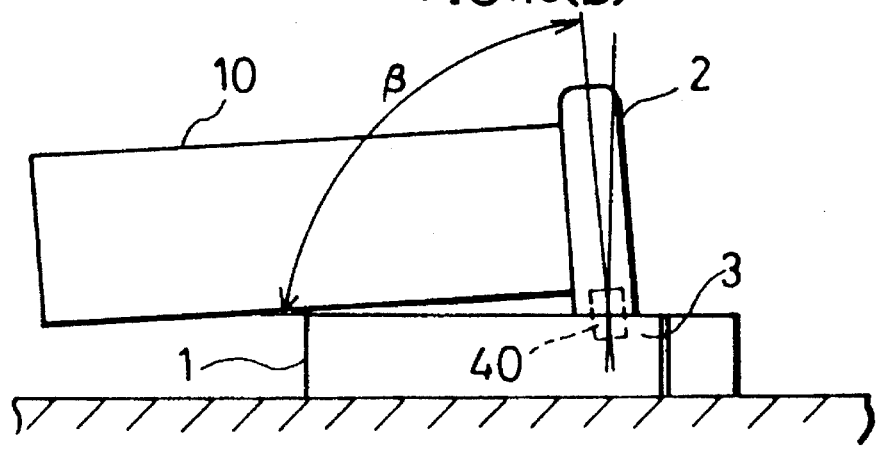
FIG. 19(b) shows a state that a sheet is inserted into the rising section.

In other words, as shown in FIG. 19(a), an angle of inclination α of the rising section 2 is previously set so that a sheet 10 does not contact with the apparatus main body 1 and an installation surface of the apparatus when the sheet 10 is carried in a carrying direction and an end of the sheet 10 is held in the rising section 2. Moreover, as shown in FIG. 19(b), an angle of inclination β of the rising section 2 is previously set so that the sheet 10 does not contact with the apparatus main body 1 and an installation surface of the apparatus when a sheet 10 with a usable size is cylindrically inserted into a through slit 12. Therefore, the angle of inclination of the rising section 2 to the apparatus main body 1 is previously set to between α and β.

Figure 20:
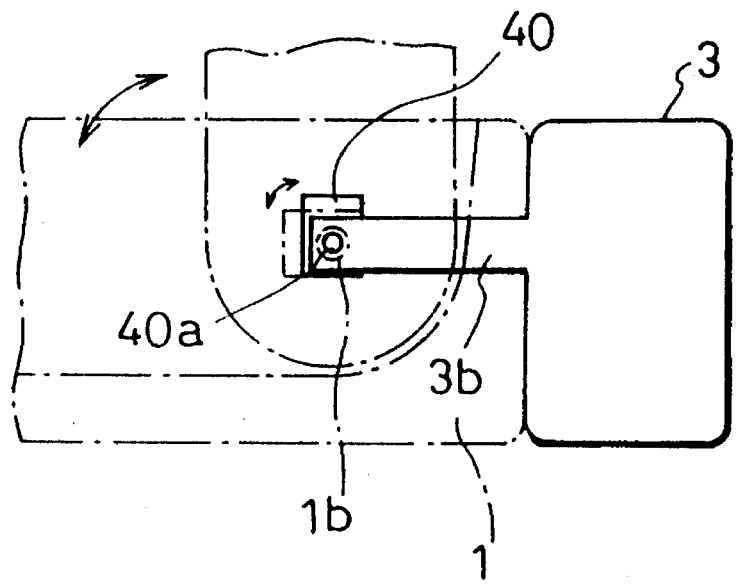
FIG. 20 is an explanatory drawing which shows an arrangement of a printing section in the portable image processing apparatus.

Here, in the case where the raised position of the rising section 2 changes within the above range of angle, relation with a printing section 40 will be a problem. However, as shown in FIG. 20, similarly to the embodiment 1, the printing section 40 of the present embodiment is provided at a point of an arm 3b which is extended towards the apparatus main body 1, but in the present invention, the printing section 40 freely rotates on an axis 40a.

In addition, the axis 40a is on a same axial line as an axis of rotation 1b of the rising section 2. As a result, the printing section 40 is also rotated according to rotation of the rising section 2. In other words, when the rising section 2 makes an arbitrary angle in the angle of inclination, the printing section 40 can suitably print along the sheet 10.

Figure 21:
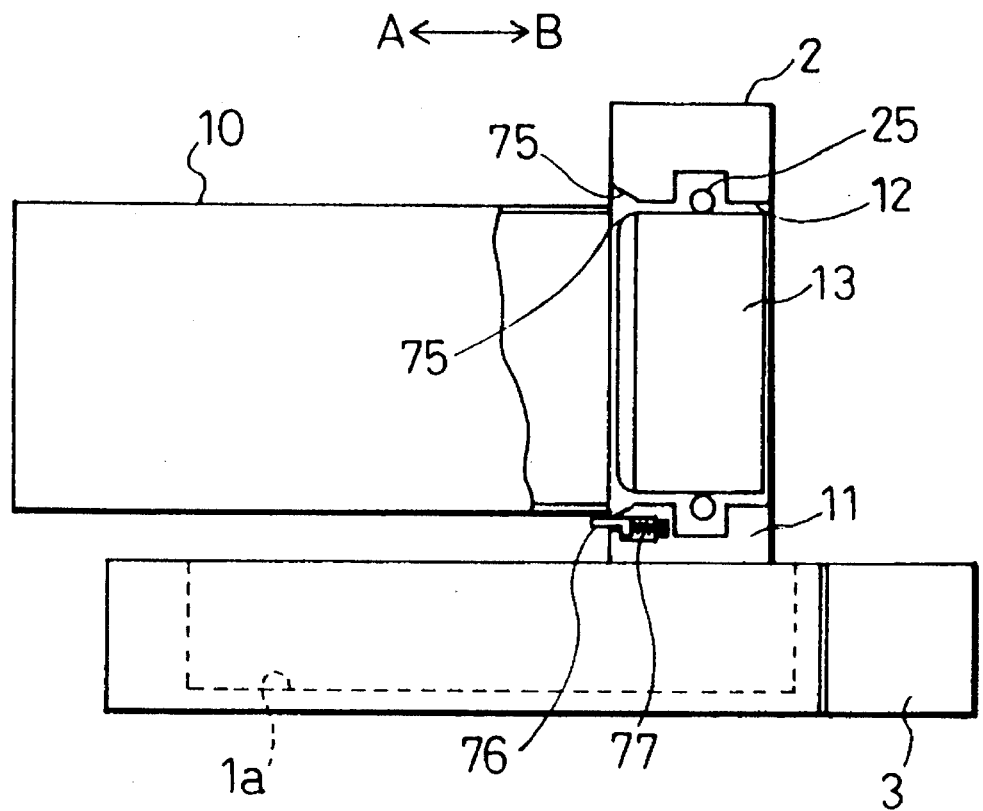
FIG. 21 is an explanatory drawing which shows an arrangement in a vicinity of a through slit in the rising section of the portable image processing apparatus.

Meanwhile, as shown in FIG. 21, in the portable image processing apparatus, tapers 75.75 in inlets on a front side (side A of an arrow) of the through slit 12 in the rising section 2.

In addition, a tongue-like section 76 is provided at a lower end of the through slit 12. A spring 77 whose one end is attached to a housing 11 is provided on a rear side (side B of the arrow) of the tongue-like section 76, and the tongue-like section 76 is energized towards the side A of the arrow by the spring 77. Therefore, when the rising section 2 is in the stored position, the tongue-like section 76 evacuates by contact with a storage dented section 1a of the apparatus main body 1, namely, it is pushed in the storage dented section 1a, but when the rising section 2 is risen, the tongue-like section 76 is protruded by the spring 77.

In addition, the tongue-like section 76 is provided along the through slit 12 such that a prescribed width is kept, and it acts as a guide for guiding an inserted end of the cylindrical sheet 10 to the through slit 12. Here, in the present embodiment, the tongue-like section 76 is formed as a continuum along the through slit 12, but it is not always limited to this, so tongue-like sections can be partially formed on some places around the through slit 12.

Figure 22:
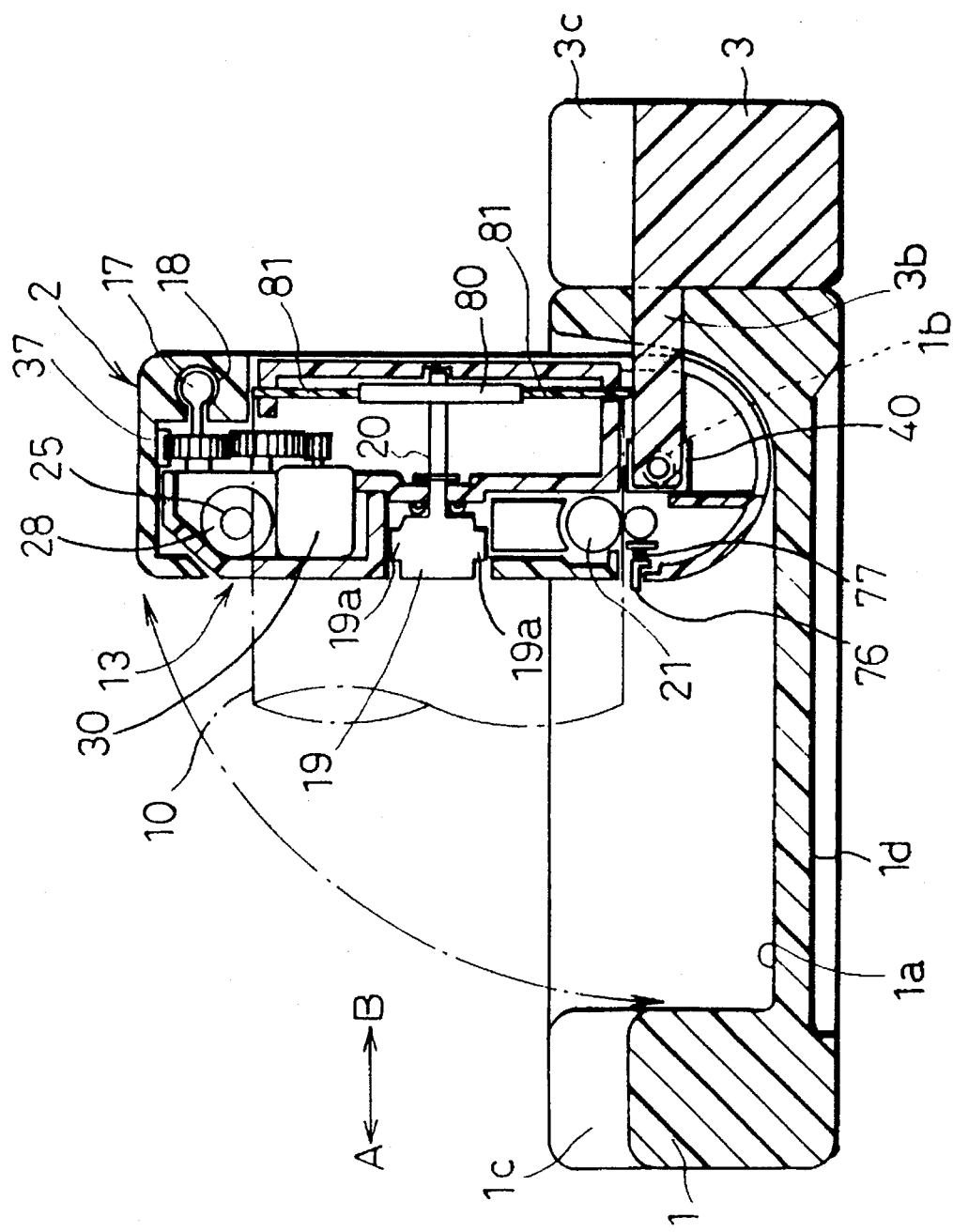
FIG. 22 is a side cross-sectional view which shows an arrangement of a sheet contact member in the rising section of the portable image processing apparatus.
Figure 23:
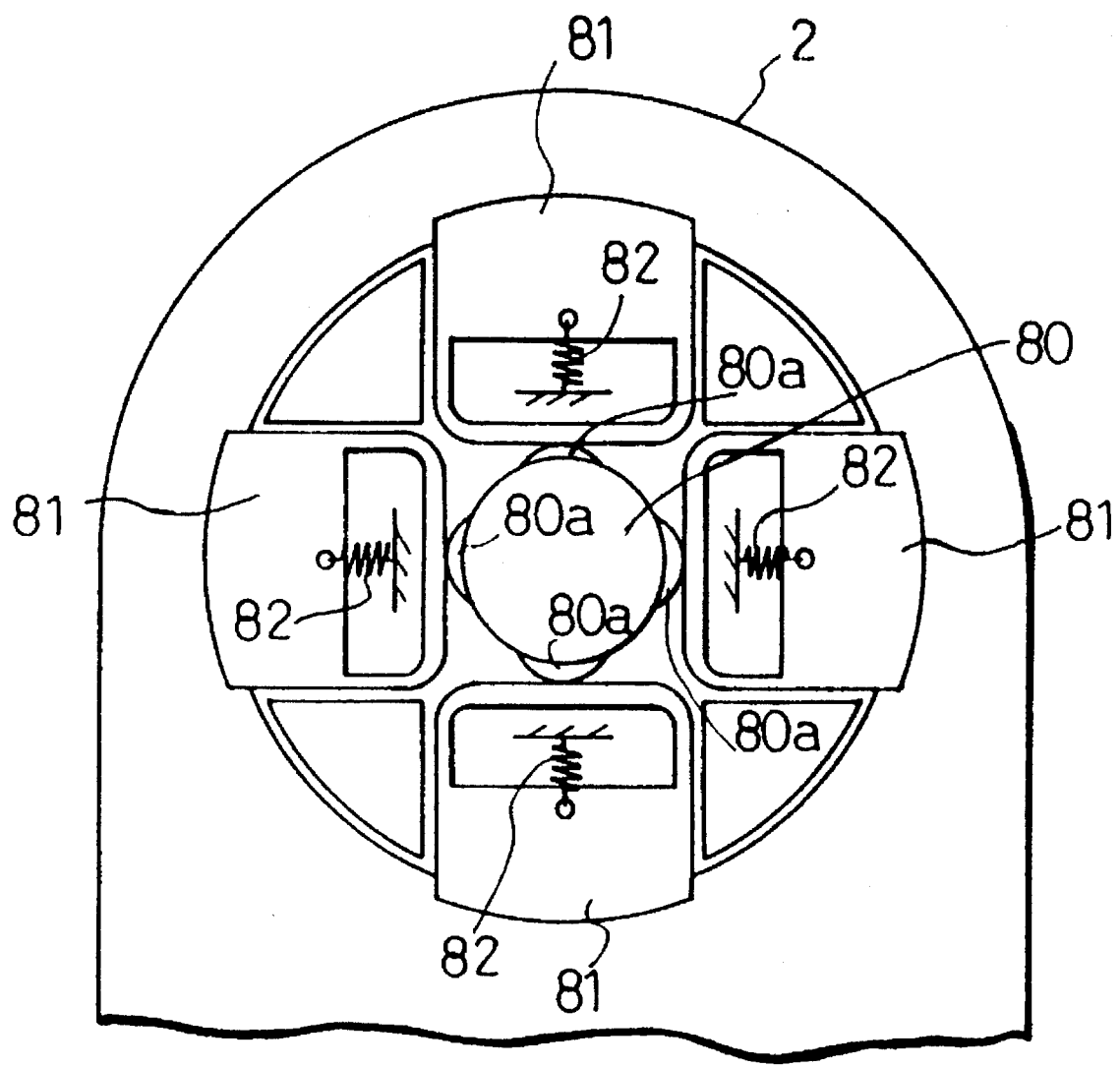
FIG. 23 is a rear view of a main section which shows an arrangement the sheet contact member in the rising section of the portable image processing apparatus.
Figure 24A:
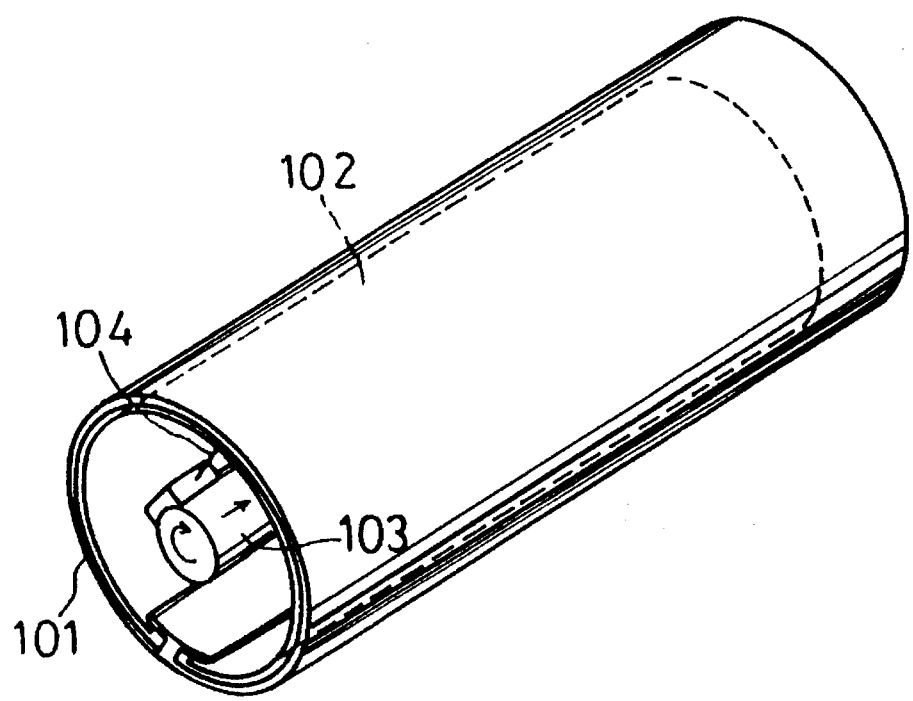
FIG. 24(a) is a perspective view.
Figure 24B:
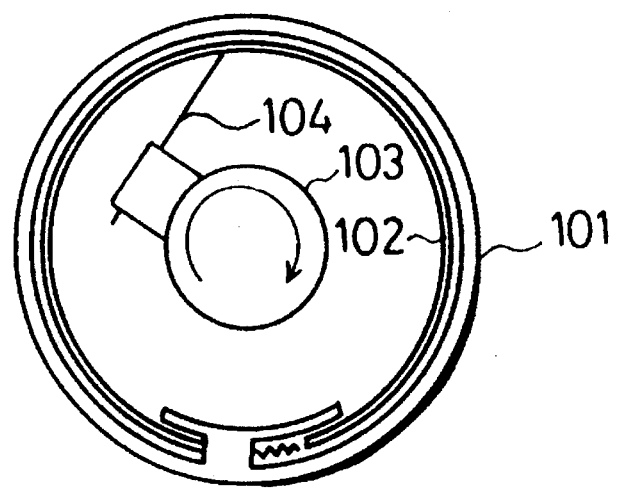
FIG. 24(b) is a front view.

In addition, as shown in FIG. 22, in the portable image processing apparatus of the present embodiment, a disc-like operation member 80 which is rotatable together with the sheet set control 19 and an axis 20 is provided on an outlet side (side B of an arrow in the drawing) of the sheet 10 on the axis 20 of the sheet set control 19. As shown in FIG. 23, projected portions 80a . . . are provided in sideways or up or down directions of the operation member 80. Moreover, sheet contact members 81 . . . which can freely move sideways or up or down are provided in sideways, up and down directions of an outer circumference side of the operation member 80. The sheet contact members 81 . . . are energized towards a center by springs 82 . . . , and center ends of the sheet contact members 81 . . . always contacts with on a periphery of the operation member 80 by energizing force of the springs 82 . . . .

In addition, when the operation member 80 is rotated and the projected portion 80a contacts with inner circumferential ends of the sheet contact members 81 . . . , the outer circumferential ends of the sheet contact members 81 . . . transfer to a position past the through slit 12. Then, when the end of the inserted sheet 10 contacts with the sheet contact members 81 . . . , the sheet 10 is stopped in this position, thereby arranging the end of the sheet 10. As a result, at the time of printing or image reading, an unprocessed portion with a fixed width is formed on the end of the sheet 10. Therefore, positions of the sheet contact members 81 . . . on the axis 20 is previously set so as to be a prescribed position considering the width of the unprocessed portion.

Meanwhile, when the sheet contact members 81 . . . do not contact with the projected portion 80a by rotation of the operation member 80, namely, when the sheet set control 19 is in a set position, the sheet contact members 81 . . . are withdrawn further towards inside than the inner circumference of the through slit 12. Therefore, when the sheet 10 moves in the carrying direction, the carrying of the sheet 10 is not prevented by the sheet contact members 81 . . . .

As mentioned above, in the portable image processing apparatus of the present embodiment, when the sheet set control 19 for operating the holding rollers 21.21.21 in order to hold the sheet 10 is rotated, the apparatus main body 1 is turned ON by interlocking with the rotation of the sheet set control 19. Therefore, since the apparatus main body 1 is turned ON after the sheet 10 is held, excess power consumption can be held down, and usable time of the apparatus at the time of carrying the apparatus can be further prolonged.

In addition, in the portable image processing apparatus of the present embodiment, the rising section 2 keeps its raised position at a prescribed range of angle where the sheet 10 does not contact with an installation surface of the apparatus main body 1. For this reason, when the sheet 10 is transferred in the carrying direction, the sheet 10 contacts with the installation surface, so displacement of an image, folding of the sheet 10, etc. can be prevented from occurring.

In addition, the portable image processing apparatus of the present embodiment is arranged such that when the sheet 10 is cylindrically inserted on an outer circumference of the sheet holding section 13, the end of the sheet 10 contacts with the sheet contact members 81 . . . provided on a discharge side of the sheet holding section 13 for the sheet 10. As a result, it can be prevented that the sheet 10 is inclined when the sheet 10 is held. Therefore, inclined image process on the sheet 10 and faulty carrying of the sheet 10 can be prevented. Moreover, the tapers 75.75 and the tongue-like section 76 are formed on the inlet side of the through slit 12 of the present embodiment. For this reason, the cylindrical sheet 10 can be easily inserted into the through slit 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable image processing apparatus comprising:
   sheet holding means having a cylindrical section which is formed so as to have a substantially cylindrical shape, said sheet holding means holding a sheet along a side of the cylindrical section;
   image processing means for carrying out an image process on the sheet held by said sheet holding means, said image processing means being fixed in an opposite position to the side of the cylindrical section of said sheet holding means;
   rotating means for rotating said sheet holding means on an axis of the cylindrical section; and
   sheet carrying means for carrying the sheet in a direction which is parallel to the axis of the cylindrical section of said sheet holding means.

2. The portable image processing apparatus as defined in claim 1, further comprising:
   a storage for storing said sheet holding means, image processing means, rotating means and sheet carrying means; and
   an outer frame section having a dented section for wholly storing said storage,
   wherein said storage is joined to the outer frame section so as to be freely in an arbitrary position between a raised position and a stored position, said raised position being a position where said storage is raised from said outer frame section, said stored position being a position where said storage is lowered in said outer frame section, said outer frame section becoming a backing stand when said storage is in the raised position.

3. The portable image processing apparatus as defined in claim 2, further comprising:
   a projected section provided in one of said storage and said outer frame section; and
   a power source switch in a position in the other of said storage and said outer frame section where said power source switch is pressed by said projected section when said storage is in the raised position with respect to said outer frame section,
   wherein said power source switch is pressed by said projected section so that electric power source of an apparatus main body is turned ON.

4. The portable image processing apparatus as defined in claim 1, further comprising:
   a cartridge section which is provided so as to be freely installed to and removed from the apparatus,
   wherein said image processing means is attached to the cartridge section.

5. The portable image processing apparatus as defined in claim 4, further comprising:
   storing means for storing data;
   judging means for judging the type of said image processing means; and
   I/O switching means for switching input/output of data between said storing means and said image processing means according to the judgement of said judging means,
   wherein said I/O switching means receives data from said image processing means when said image processing means is judged by said judging means as reading means for reading data from a document, whereas outputs data to said image processing means when said image processing means is judged by said judging means as printing means for printing data on a document.

6. The portable image processing apparatus as defined in claim 5, further comprising:
   data processing means for processing data provided between said image processing means and said storing means,
   wherein said data processing means processes the data inputted from said image processing means according to a format which is used for storing of the data to said storing means and processes the data taken out from said storing means according to a format which is used when said image processing means prints the data.

7. The portable image processing apparatus as defined in claim 1, further comprising:
   printing density input means for inputting printing density by an operator,
   wherein said image processing means includes a printing section having a plurality of printing elements per 1 picture element and density adjusting means for adjusting a number of printing elements for carrying out printing according to printing density inputted from said printing density input means.

8. The portable image processing apparatus as defined in claim 1, further comprising a connector for communicating of data with an outer apparatus.

9. The portable image processing apparatus as defined in claim 1 wherein said image processing means includes illuminating means for illuminating sheets, image density detecting means for outputting density of an image read from a sheet by a reflected light from said illuminating means.

10. The portable image processing apparatus as defined in claim 1, further comprising:

control means for alternately commanding said image processing means to carry out the image process and to drive said rotating means or said sheet carrying means, wherein said control means controls said rotating means so as to transfer a sheet in a scanning direction for a distance according to a dimension of a range, in which said image processing means carries out the image process at a time, in the scanning direction and controls said sheet carrying means so as to transfer a sheet in the carrying direction for a distance according to a dimension of the carrying direction in a range where said image processing means carries out the image process at a time.

11. The portable image processing apparatus as defined in claim 1, further comprising:

an input section for inputting a size of a sheet by an operator;

processing range calculating means for obtaining a dimension of a processing range in a scanning direction and a carrying direction from a sheet size inputted from said input section; and control means for alternately commanding said image processing means to carry out the image process and driving said rotating means or said sheet carrying means until all the image processes in the processing range is completed, wherein said control means drives said rotating means until a transferring distance of a sheet in the scanning direction reaches the dimension of the processing range in the scanning direction, which has been obtained by said processing range calculating means, and in the case where the transferring distance reaches the dimension, reset the transferring distance of the sheet in the scanning and drives said sheet carrying means.

12. The portable image processing apparatus as defined in claim 11 wherein said control means controls said rotating means so as to reverse a rotating direction of said sheet holding means every time the transferring distance of a sheet in the scanning direction reaches the dimension of the processing range in the scanning direction, which has been obtained by said processing range calculating means.

13. The portable image processing apparatus as defined in claim 1, further comprising:

a sheet detecting sensor for outputting an insertion detecting signal and a removal detecting signal in the case where insertion or removal of a sheet is detected;

image processing operation control means for controlling the image processing operation; and a power source switch for supplying a power to another members when said power source switch is turned ON, said power source switch turned ON/OFF by said image processing operation control means, wherein said image processing operation control means turns ON said power source switch so as to start the image processing operation when the insertion detecting signal is inputted from said sheet detecting sensor and turns OFF said power source switch so as to be in a standing-by state when the image processing operation is completed and the removal detecting signal is inputted from said sheet detecting sensor.

14. A portable image processing apparatus comprising:

a sheet holding section having (1) a cylindrical section which is formed so as to have a substantially cylindrical shape and (2) a sheet carrier which is positioned on an outer circumference of the cylindrical section so that a small gap is formed between the cylindrical section and the sheet carrier and that an axis of rotation is included in a plane which intersects at right angles to the axis of the cylindrical section and (3) a pressing roller for contacting with and leaving from said sheet carrier, said sheet holding section holding a sheet inserted in the gap between the cylindrical section and the sheet carrier with the sheet pressed against the sheet carrier by the pressing roller;

image processing means for carrying out an image process on the sheet held by said sheet holding section, said image processing means being fixed in an opposite position to the side of the cylindrical section of said sheet holding section;

sheet holding section driving means for rotating said sheet holding section on the axis of the cylindrical section; and sheet carrier driving means for rotating said sheet carrier on the axis of rotation.

15. The portable image processing apparatus as defined in claim 14, further comprising:

a cartridge section which is provided so as to be freely installed to and removed from the apparatus, wherein said image processing means is attached to the cartridge section.

16. The portable image processing apparatus as defined in claim 15, further comprising:

storing means for storing data;

judging means for judging the type of said image processing means; and

I/O switching means for switching input/output of data between said storing means and said image processing means according to the judgement of said judging means, wherein said I/O switching means receives data from said image processing means when said image processing means is judged by said judging means as reading means for reading data from a document, whereas outputs data to said image processing means when said image processing means is judged by said judging means as printing means for printing data on a document.

17. The portable image processing apparatus as defined in claim 14, further comprising:

printing density input means for inputting printing density by an operator, wherein said image processing means includes a printing section having a plurality of printing elements per 1 picture element and density adjusting means for adjusting a number of printing elements for carrying out printing according to printing density inputted from said printing density input means.

18. The portable image processing apparatus as defined in claim 14 wherein said image processing means includes illuminating means for illuminating sheets, image density detecting means for outputting density of an image read from a sheet by a reflected light from said illuminating means.

19. The portable image processing apparatus as defined in claim 14, further comprising a connector for communicating of data with an outer apparatus.

20. The portable image processing apparatus as defined in claim 14 wherein said sheet holding section includes a plurality of pressing rollers, said portable image processing apparatus, further comprising:

a sheet set member having a disc and a same number of projected sections as the pressing rollers provided in an outer circumference of the disc at intervals according to positions of the pressing rollers, said sheet set member provided so as to be rotatable on an axis of the disc, wherein said sheet set member is rotated to a position where the projected sections press said pressing rollers so that said pressing rollers are pressed against the sheet carrier.

21. The portable image processing apparatus as defined in claim 20, further comprising:

a sheet detecting sensor for detecting insertion of a sheet so as to output a sheet detecting signal; and sheet set means for when the sheet detecting signal which has been outputted from said sheet detecting sensor is inputted, rotating said sheet set member.

22. The portable image processing apparatus as defined in claim 14, further comprising:

a switch pressing section which is provided in an outer circumference of a disc of said sheet set member so as to be projected in a different position from of the projected sections; and a power source switch which is provided in a position where said power source switch is pressed by said switch pressing section when the sheet set members is rotated to a position where the projected sections press said pressing rollers.

23. The portable image processing apparatus as defined in claim 14, further comprising:

an operation member including a disc and a projected section provided in an outer circumference of the disc, said disc provided in a common axis with the sheet set member, said disc rotating according to rotation of the sheet set member; and a gap blocking member which advances more outward than the outer circumference of the cylindrical section of said sheet holding section in the case where the projected sections of said operation member press said gap blocking member, wherein the projected sections of said operation member are provided in a position where the projected sections of said operation member press said gap blocking member when the projected sections of said sheet set member do not press said pressing rollers, and do not press said gap blocking member when the projected sections of said sheet set member press said pressing rollers.

24. The portable image processing apparatus as defined in claim 14, further comprising:

a sheet detecting sensor for detecting insertion of a sheet so as to output a sheet detecting signal; and sheet set means for when the sheet detecting signal which has been outputted from said sheet detecting sensor is inputted, pressing said pressing rollers against said sheet carrier.

25. The portable image processing apparatus as defined in claim 24 wherein said sheet set means presses said pressing rollers against said sheet carrier after inputting the sheet detecting signal outputted from said sheet detecting sensor and drives said sheet carrying section driving means so as to carry the sheet to an image process starting position.

26. The portable image processing apparatus as defined in claim 14, further comprising:

a sheet detecting sensor for outputting an insertion detecting signal and a removal detecting signal in the case where insertion or removal of a sheet is detected;

image processing operation control means for controlling the image processing operation; and a power source switch for supplying a power to another members when said power source switch is turned ON, said power source switch turned ON/OFF by said image processing operation control means, wherein said image processing operation control means turns ON said power source switch so as to start the image processing operation when the insertion detecting signal is inputted from said sheet detecting sensor and turns OFF said power source switch so as to be in a standing-by state when the image processing operation is completed and the removal detecting signal is inputted from said sheet detecting sensor.

27. The portable image processing apparatus as defined in claim 14, wherein said sheet carrier driving means includes a stepping motor, wherein said sheet carrier includes a coil spring whose both ends are connected to output axis of the stepping motor and a tube member which coats the coil spring.

28. The portable image processing apparatus as defined in claim 14, further comprising:

a storage which is provided so as to coat said sheet holding section; and a rack gear which is provided inside said storage, wherein said sheet holding section driving means includes a pinion gear provided to said sheet holding section and a stepping motor for rotating the pinion gear.

29. The portable image processing apparatus as defined in claim 14, further comprising:

control means for alternately commanding said image processing means to carry out the image process and drive said sheet holding section driving means or said sheet carrying section driving means, wherein said control means controls said sheet holding section driving means so as to transfer a sheet in a scanning direction for a distance according to a dimension in the scanning direction of a range, in which said image processing means carries out the image process at a time, in the scanning direction and controls said sheet carrying section driving means so as to transfer a sheet in the carrying direction for a distance according to a dimension of a range, in which said image processing means carries out the image process at a time, in the carrying direction.

30. The portable image processing apparatus as defined in claim 14, further comprising:

an input section for inputting a size of a sheet by an operator;

processing range calculating means for obtaining a dimension of a processing range in a scanning direction and a carrying direction from a sheet size inputted from said input section; and control means for alternately commanding said image processing means to carry out the image process and driving said sheet holding section driving means or said sheet carrying section driving means until all the image processes in the processing range is completed, wherein said control means drives said sheet holding section driving means until a transferring distance of a sheet in the scanning direction reaches the dimension of the processing range in the scanning direction, which has been obtained by said processing range calculating means, and in the case where the transferring distance reaches the dimension, drives said sheet carrying section driving means.

31. The portable image processing apparatus as defined in claim 30 wherein said control means controls said sheet holding section driving means so as to reverse a rotating direction of said sheet holding section every time the transferring distance of a sheet in the scanning direction reaches the dimension of the processing range in the scanning direction, which has been obtained by said processing range calculating means.

32. The portable image processing apparatus as defined in claim 14, further comprising:

a storage for storing at least said sheet holding section and image processing means; and an outer frame section having a dented section for wholly storing said storage, wherein said storage is joined to the outer frame section so as to be freely in an arbitrary position between a raised position and a stored position, said raised position being a position where said storage is raised from said outer frame section, said stored position being a position where said storage is lowered in said outer frame section, said outer frame section becoming a backing stand of said storage when said storage is in the raised position.

33. The portable image processing apparatus as defined in claim 32, wherein said storage keeps the raised position at a prescribed range of angle to an installation surface of the apparatus, the prescribed range of angle being a range where the sheet does not contact with the installation surface of said outer frame section and the apparatus with an end of the sheet held by said sheet holding section, wherein said image processing means is provided so as to be rotatable on a same axis as a raising/lowering axis where said storage and outer frame section are joined, said image processing means rotating together with said storage on the raising/lowering axis.

34. The portable image processing apparatus as defined in claim 33 wherein said storage is provided with an opening section for inserting a sheet along the outer circumference on the side of the cylindrical section of said sheet holding section viewing from a front with said storage is in the raised position with respect to said outer frame section.

35. The portable image processing apparatus as defined in claim 34, further comprising:

a tongue-like member provided in a lower end portion of the opening section viewing from a front with said storage is in the raised position with respect to said outer frame section; and an energizing member for energizing said tongue-like member outside said storage;

wherein said tongue-like member is energized by said energizing member so as to be projected outside said storage in the case where said storage is in the raised position, and is stored in the storage in the case where said storage is in the stored position.

* * * * *